ical Patent [19]

[11] Patent Number: 5,064,720

Kempo et al.

[45] Date of Patent: Nov. 12, 1991

[54] MAGNETIC RECORDING MEDIUM CONTAINING A POLYURETHANE BINDER RESIN HAVING A BETAINE GROUP IN THE FORM OF AN INTERMOLECULAR SALT

[75] Inventors: Tsutomu Kempo; Atsuko Matsuda; Narito Goto, all of Tokyo, Japan

[73] Assignee: Konica Corporation, Tokyo, Japan

[21] Appl. No.: 396,658

[22] Filed: Aug. 22, 1989

[30] Foreign Application Priority Data

Aug. 25, 1988 [JP] Japan .................................. 63-211537
Aug. 25, 1988 [JP] Japan .................................. 63-211538
Aug. 31, 1988 [JP] Japan .................................. 63-217393
Oct. 18, 1988 [JP] Japan .................................. 63-263274

[51] Int. Cl.$^5$ ............................................. G11B 23/00
[52] U.S. Cl. .................................. 428/423.1; 428/424.6; 428/425.8; 428/425.9; 428/694; 428/900
[58] Field of Search ................... 428/694, 900, 423.1, 428/425.8, 425.9, 424.6

[56] References Cited

U.S. PATENT DOCUMENTS 4,182,828  1/1980  Reischal et al. ................... 528/69
4,404,253  9/1983  Kohler et al. ...................... 428/327
4,784,914  11/1988 Matsufuji et al. .................. 428/418
4,956,220  9/1990  Sueyoshi et al. ................... 428/141

FOREIGN PATENT DOCUMENTS 58-179936 10/1983  Japan .

Primary Examiner—Paul J. Thibodeau
Assistant Examiner—Stevan A. Resan
Attorney, Agent, or Firm—Finnegan, Henderson, Farabow, Garrett, and Dunner

[57] ABSTRACT

A magnetic recording medium containing a specific binder resin is disclosed. The magnetic recording medium comprising a magnetic layer which contains a magnetic powder and a binder, in which the binder comprises a polyurethane resin having an anionic functional group being in a form of intramolecular salt; and the magnetic powder is selected from the group consisting of a ferro-magnetic cobalt-containing iron oxide powder, a ferro-magnetic chromium dioxide powder anad a magnetic metal powder containing iron atoms and aluminum atoms in a portion of from 100:1 to 100:20 in terms of the number of atoms.

22 Claims, 2 Drawing Sheets

MAGNETIC RECORDING MEDIUM CONTAINING A POLYURETHANE BINDER RESIN HAVING A BETAINE GROUP IN THE FORM OF AN INTERMOLECULAR SALT

FIELD OF THE INVENTION

This invention relates to a magnetic recording medium including, for example, a magnetic tape, a magnetic sheet, and a magnetic disk.

BACKGROUND OF THE INVENTION

With the advance of making higher the density and S/N of magnetic recording media such as magnetic tapes, it has recently begun to use magnetic powder having more smaller particle-sizes.

It is generally said that an S/N ratio of a magnetic recording medium is in proportion to a square root of the particle numbers of magnetic powder contained in a recording material relating to image recording/reproducing operations. When coating the same amount of magnetic powder, it is, therefore, more advantageous for improving an S/N if using magnetic powder having more smaller particle-size. It is also advantageous for obtaining higher electromagnetic conversion efficiency when magnetic powder is finely grained and the specific surface area determined by BET method thereof (hereinafter referred to simply BET value) is increased, because the surface of a magnetic layer may be made so smooth as much and a spacing loss may also be reduced.

The surface of a particle is, however, enlarged at the inverse square of the particle-size. Therefore, the particles can hardly be dispersed drastically as the particle-size is made smaller and the dispersion stability thereof is also deteriorated. The above-mentioned troubles will cause the inconvenience such as the deteriorations in the orientation of a ferromagnetic substance and the surface smoothness of a magnetic layer surface and will result in impossibility of obtaining any excellent squareness and S/N ratios.

As for the binders for magnetic tapes, mainly, a polyester type polyurethane and a vinyl chloride-vinyl acetate copolymer have been used conventionally. However, these binders have been unable to display any satisfactory dispersibility. To cope with this problem, there have used such a method that the dispersibility of magnetic powder in a binder is improved by controlling the particle size distribution of the magnetic powder, or that a surfactant is used for a dispersant. Further, there is a proposal for a method in which a binder is modified by introducing thereinto a hydrophilic group such as a hydroxyl group, a phospho group, a sulfo group, or a carboxy group so as to improve the capability for dispersion thereof.

There may, however, be some instances where a satisfactory dispersibility may not be obtained even by making use of such a binder as mentioned above. It has, therefore, been expected to realize a binder having a high adsorptive power to the surfaces of a magnetic powder.

SUMMARY OF THE INVENTION

It is an object of the invention to provide a magnetic recording medium, excellent in electromagnetic conversion characteristics in the preparation of which a smoothly adsorbs to binder to the surface of magnetic powder and the magnetic powder can be dispersed a period of time in a short time, and further the dispersion stability is high.

The objects of the invention can be achieved with a magnetic recording medium comprising a magnetic layer containing a binder and magnetic powder, wherein the binder comprises polyurethane resin having an anionic functional group being in a form of intramolecular salt, and the magnetic powder is selected from the group consisting of a cobalt-containing iron oxide magnetic powder, a ferromagnetic chromium dioxide powder, or a metal magnetic powder containing iron atom and aluminium atom in a proportion of from 100:2 to 100:20 in terms Of the number of atoms.

DETAILED DESCRIPTION OF THE INVENTION

Figure 1:
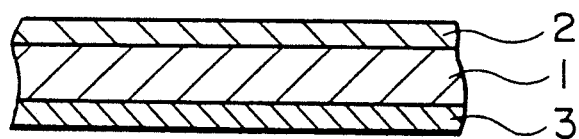
FIGS. 1 and 2 are the partially enlarged cross-sectional views each illustrating an example of magnetic recording media.

First, 'Polyurethane in which an anionic group forms an intramolecular salt' will be detailed.

Now, the preparation method thereof will be detailed.

Similar to the ordinary methods of synthesizing polyurethane, a polyol having a high molecular weight of 500 to 3000 such as polycarbonate polyol, polyester polyol, polylactone polyol, or polyether polyol is reacted with a polyfunctional aromatic or aliphatic isocyanate to synthesize together, and thereby synthesized a polycarbonate polyurethane which is carbonated with polyester polyurethane, polyether polyurethane, phosgene, or diphenyl carbonate.

These polyurethanes are prepared through the reaction of mainly polyisocyanate with polyol and, if required, with other copolymers. These polyurethanes may be urethane resins or urethane polymers each containing a free isocyanate group and/or a hydroxyl group, or they may also be a urethane elastomer or the like which does not contain the above reactive terminal group. The isocyanate components applicable thereto include, for example, various diisocyanate compounds such as hexamethylenediisocyanate (HMDI, diphenylmethanediisocyanage (MDI), hydrogenated MDI ($H_{12}$MDI), toluenediisocyanate (TDI), 1,5-naphthalenediisocyanate (NDI), tolidinediisocyanate (TODI), lysinediisocyanate methylester (LDI), and isophoronediisocyanate (IPDI). Further, if required, a low molecular weight polyfunctional alcohol such as 1,4-butanediol, 1,6-hexanediol, and 1,3-butanediol, may be used to control a molecular weight, the physical properties of a resin, and so forth.

The functional group forming an intramolecular salt may be introduced into an isocyanate component. On the other hand, it may be introduced into a polyol component, and it may further be introduced into the above-mentioned low molecular weight polyfunctional alcohol.

Polyesterpolyol, in which the anionic functional group thereof forms an intramolecular salt, may be synthesized by condensation polymerizing various dicarboxylic acid components and polyhydric alcohol components with dicarboxylic acid component in which the anionic functional group forms an intramolecular salt and/or polyhydric alcohol component in which the anionic functional group forms an intramolecular salt. Such dicarboxylic acid components may be exemplified by those of terephthalic acid, isophthalic acid, sebacic acid, adipic acid, dimerized linolenic acid, and maleic acid. The polyhydric alcohols may be exemplified by glycols such as ethylene glycol, propylene glycol, and diethylene glycol; polyhydric alcohols such as trimethylol propane, hexane triol, glycerol, trimethylol ethane, pentaerythritol, and the glycols thereof. Any two or more kinds of the polyhydric alcohols can be used at the same time.

Lactone type polyester polyol, in which the anionic functional group thereof forms an intramolecular salt, may be prepared by introducing the anionic functional group into a caprolactam such as s-caprolactam, α-methyl-1-caprolactam, s-methyl-s-caprolactam, or γ-butylolactam.

Polyether polyol, in which the anionic functional group forms an intramolecular salt, may be prepared by introducing the functional group into ethylene oxide, propylene oxide, butylene oxide, or the like.

The functional groups each forming an intramolecular salt may be exemplified by the betaine group of which will be detailed later.

The polyester polyols, in which the anionic functional group forms an intramolecular salt will further be detailed.

An ordinary method of synthesizing a polyester is carried out through a condensation reaction of an acid component containing an aliphatic or aromatic polyfunctional acid or the derivatives thereof with an aplipatic or aromatic polyfunctional alcohol component. The intramolecular amphoteric base such as a betaine group of the invention may be contained in either the acid component or an alcohol component. It is also allowed to introduce a betaine group into a polymer through a high molecular reaction. It is, however, easier to control when such functional group is contained in the monomer of a polymer, taking an unreacted component and an introduction proportion into consideration.

Such betaine groups may be exemplified by a sulfobetaine group, a phosphobetaine group, and a carboxybetaine group. Among these betaine groups, a sulfobetaine group and a phosphobetaine group should preferably be used. Thes betaine type functional groups may be represented by the following formula:

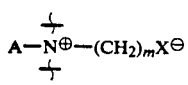

Formula I wherein
n⊕: The polyurethane chain of the polyurethane resin.
X: —SO₃⊖, —O—SO₃⊖, —COO⊖, —O—PO₃H⊖, —CPO₃⊖ or —OPO₂H₂⊖,
A: A hydrogen atom or an alkyl group such as a methyl group or an ethyl group, which has 1 to 60 carbon atoms, and
m: An integer of 1 to 10.

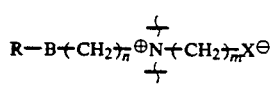

Formula II wherein
B: —COO or CONH,
R: An alkyl, alkenyl or aryl group having 1 to 12 carbon atoms, and
m: An integer of 1 to 10.

Betaines group containing-monomers, which are applicable to the invention, include the compounds exempified below. The polyurethane resins applicable to the invention shall not be limited to those applied with the monomers given below.

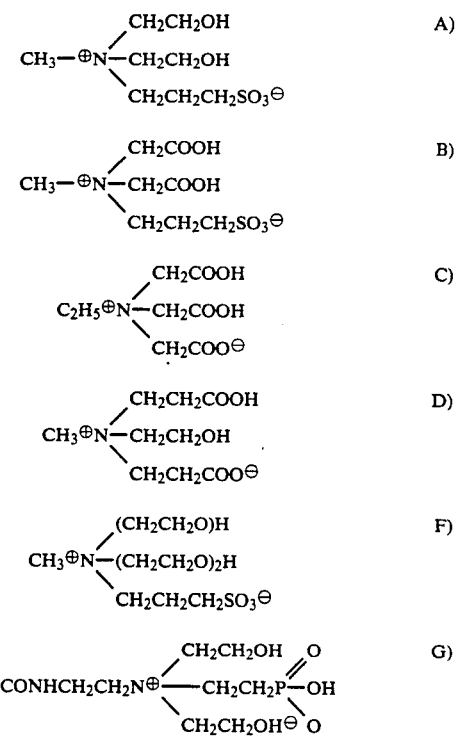

A monomer in which the aforementioned anionic functional group forms an intramolecular salt is available on the market as a chemical product, while it may however readily be prepared in the following method.

1) A synthesizing method in which monochloroacetic acid is used

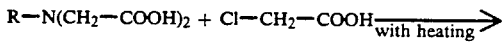

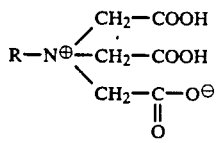

wherein R is an alkyl group such as a methyl or ethyl group.

2) Synthesizing method in which monochlorosuccinic acid is used

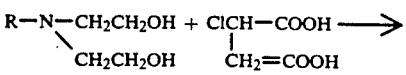

-continued

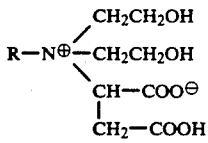

3) Synthesizing method in which propanesultone is used

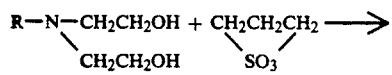

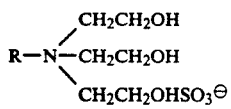

As one of the high-molecular reactions, a reaction of introducing a betaine group into a polymer will now be detailed. This reaction is that a compound containing a betaine group is reacted with an OH group that is present at the terminal or the side-chain of a polyurethane having a chain extended in advance to a certain molecular weight through a polymerization reaction. In this case of the reaction, a compound containing a hydroxyl group and a betaine group is synthesized first and is then reacted with a polyfunctional isocyanate such as diisocyanate each other in an amount of the same mol. Next, the reaction product is prepared by reacting one of the NCO groups of the diisocyanate with the hydroxyl group of the above-mentioned compound, and the OH group of the polyurethane is reacted with the other unreacted NCO group, so that a betaine group introduced polyurethane may be prepared.

Such compounds containing the above-mentioned hydroxyl group and betaine group may be exemplified as follows to which, however, the invention shall not be limited.

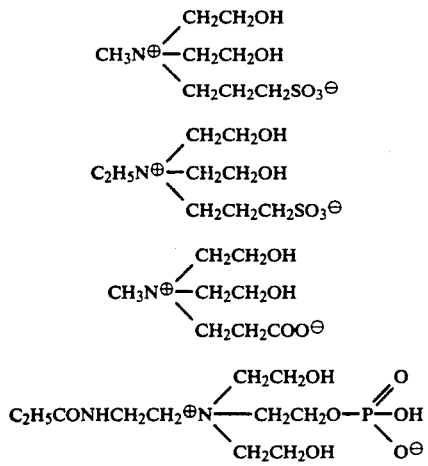

An amount of the anionic functional group such as the betaine group introduced into the polyurethane resins of the invention is to be within the range of, preferably, 0.01 to 1.0 mmol/g and, more preferably, 0.1 to 0.5 mmol/g. If an amount of the above-mentioned anionic functional group introduced is less than 0.01 mmol/g, no satisfactory effect may be observed on the dispersibility of ferromagnetic powder. If it exceeds 1.0 mmol/g, an intermolecular or intramolecular cohesion is liable to occur so that not only the dispersibility is affected but also a selectivity of solvents is produced and, resultingly, there is also a fear that any ordinary general purpose solvents may not be used.

A numeral average molecular weight of the polyurethane resins of the invention is to be within the range of, preferably, 5000 to 100000 and, more preferably, 10000 to 40000. If a numeral average molecular weight of a resin is less than 5000, the resin will be unsatisfactory in layer forming function, and if it exceeds 100000, there is a fear of raising problems in the paint preparing steps such as those of mixing, transporting and coating.

Synthesis Examples

A sulfobetaine type polyfunctional monomer was prepared by reacting 1 mol of N methyldiethanolamine with 1 mol of propanesultone at a temperature of 120° C. for 3 hours.

Next, 1.5 mols of adipic acid, 1.7 mols of 1,4-butanediol and 0.06 mols of the above-mentioned sulfobetaine type basic polyfunctional monomer were mixed together. The temperature of the mixture was raised to 150° to 200° C. by taking a period of about 3 hours, and a reaction was further made at 200° C. for 4 hours. After removing the unreacted materials at 3 to 5 mmHg, a further reaction was made until the acid value became to not higher than 2. The molecular weight of the resulting copolymerized polyester was Mw 2500. After 165 g of copolymerized polyester was dissolved in 300 parts of methylethyl ketone, a 2 hour-reaction was made by adding 80 parts of diphenylmethane diisocyanate at 80° C. A further 2-hour-reaction was made by adding 20 parts of 1,4-butane diol, and a 1-hour-reaction was made by adding 4 parts of 1,3-butane diol. The molecular weight of the resulting polyurethane was Mw=35000 and Mn=22000.

Next, 'cobalt-containing iron oxide magnetic powder' applicable to the invention will be detailed.

When generally representing ferromagnetic iron oxide particles by FeOx, the value of x should be within the range of $1.33 <$ or $=x<$ or $=1.50$, that is, they include maghemite, i.e., $\gamma$-Fe$_2$O$_3$, x=1.50, magnetite, i.e., Fe$_3$O$_4$, x=1.33, and the solid solutions thereof, i.e., FeOx, $1.33<x<1.50$.

$\gamma$-Fe$_2$O$_3$ and Fe$_3$O$_4$ may be usually prepared in the following method.

Ferrous hydroxide is produced by adding alkali to a ferrous salt solution and is then oxidized by blowing air thereinto at a specific temperature and pH value to obtain a needle-shaped moisture-containing iron oxide. The resulting needle-shaped iron oxide is heated at a temperature of 250° to 400° C. in the air so as to dehydrate it. Next, the iron oxide is heated at a temperature of 300° to 450° C. in a reducible atmospheric condition so as to reduce it. Thus, needle-shaped magnetite particles are prepared. If required, the resulting magnetite particles are reoxidized at a temperature of 200° to 350° C. to prepare needle-shaped maghemite, i.e., $\gamma$-Fe$_2$O$_3$.

Among these ferromagnetic iron oxides, a cobalt-containing iron oxide magnetic powders relating this invention are roughly classified into two types, namely, a dope-type for one and an adhered-type for the other.

Co-dope type iron oxide particles may be prepared in the following methods, for example, (1) A method in which ferric iron hydroxide containing cobalt hydroxide is subjected to a hydrothermal treatment in an alkaline atmosphere and the powders thereby produced are subjected to reduction and oxidation;

(2) A method in which a cobalt salt solution is added in advance to synthesize cobalt-containing goethite, and the resulting cobalt-containing goethite is subjected to reduction and oxidation while controlling the pH value;

(3) A method in which goethite not containing Co is used as a nucleus and goethite containing Co is produced on the nucleus by making the same reaction as that made in the preceding method (2) and, then, a reduction and oxidation are made; and (4) A method in which a Co compound is adsorbed onto the surface of needle-shaped goethite or maghemite by treating it in an aqueous alkali solution containing a Co salt, and then a reduction and oxidation and made or a heat treatment is made at a relatively high temperature.

A Co-adsorbed type iron oxide magnetic particles are prepared in the following manner. Needle-shaped magnetic iron oxide and a cobalt salt are mixed in an aqueous alkali solution and heated. A cobalt compound such as cobalt hydroxide is adsorbed to iron oxide particles and washed and dried to be taken out. Next, the resulting matter is subjected to a heat treatment in a non-reducible atmosphere such as that of air, $N_2$ gas, so that the objective particles may be obtained.

As compared with Co-dope type particles, Co-adsorbed type particles are more excellent in resistivity to heating and/or pressure-demagnetization of the magnetic layer of a medium. It is, therefore, preferable to use Co-dope type particles except in peculiar cases.

Cobalt should preferably be contained in a proportion within the range of 1.0 to 5.0% by weight to the whole amount of magnetic powder. A magnetic coercivity, i.e., Hc, of magnetic powder should preferably be within the range of 600 to 1100 Oe. A specific surface area of magnetic powder should be within the range of, preferably, 10 to 70 $m^2/g$, more preferably, not narrower than 35 $m^2/g$ and, further preferably, not narrower than 45 $m^2/g$, each in terms of BET values. An average particle-size should preferably be within range of 0.1 to 0.8 $\mu m$ with respect to the longer axial direction and of the order of 0.2 to 0.01 $\mu m$ in the shorter axial direction.

The above-mentioned specific surface area is expressed by a BET value to be a surface area per unit weight, that is a physical term quite different from average particle-sizes. Therefore, even if two magnetic powder have the same average particle-size, for example, there are some instances where one has a specific surface area wider than the other has. Such specific surface area may be measure in such a method as so-called B.E.T. method -For further details, refer to J.Ame.Chem.Soc. 60 309 (1938)- in which powder is degassed while heating it at a temperature of about 250° C. for a period of 30 to 60 minutes so as to remove adsorbed matter from the powder, and the powder is then introduced into a measuring instrument in which the initial pressure of nitrogen is set to be 0.5 kg/$m^2$, so that a adsorption measurement may be carried out with nitrogen at a liquid nitrogen temperature of −195° C.

As for such an instrument for measuring the above-mentioned specific surface area, i.e., a BET value, it is allowed to use a 'powdery particle measuring instrument, i.e., a Quantasorb' jointly manufactured by Yuasa Battery Company and Yuasa-Ionix Company. Specific surface area and the measurement thereof are generally detailed in J. M. Dallavalle and Clydeorr, Jr., 'Measurement of Particles', translated by Benda et al, Sangyo-Tosho Publishing Company, and 'A Handbook of Chemistry', Applied Chemistry Edition, pp. 1170–1171, complied by The Chemical Society of Japan, published by Maruzen Book Store, issued on Apr. 30, 1966, in which the term, a specific surface area, is expressed by the term, a surface area ($m^2$/gr) that has the same meaning as that in this specification.

In the cobalt-containing iron oxide magnetic powder applicable to the invention, aluminium or silicon should preferably contained.

In the intramolecular salt of a binder, the acidic and basic sites thereof adsorb effectively to the surface active site, i.e., the basic and acidic sites, of magnetic powder. In the case of the magnetic powder containing aluminium or silicon, suitable basic and acidic sites are given to the magnetic powder surfaces by the working of the silicon or aluminium on the magnetic powder surface, so that the adsorption amount thereof to the binder can more be increased. It may therefore be considered that the dispersibility can remarkably be improved.

When silicon is added to cobalt-containing iron oxide magnetic powder, the silicon content thereof is within the range of 0.01 to 0.60% by weight and, preferably, 0.05 to 0.30% by weight. If a silicon content of magnetic powder is less than 0.01% by weight, the surface activity of the magnetic powder may not be increased so as to inhibit the magnetic powder from adsorbing to the polyurethane of the invention. On the other hand, even if exceeding 0.60% by weight, there may be some instances where an affect may not be displayed as much as the silicon content is increased and may contrarily cause a deterioration of magnetic properties. In this description, the expression, 'containing', herein includes the case where silicon is made adsorb to magnetic particle surfaces.

The above-mentioned silicon may also be made adsorb to cobalt-containing iron oxide magnetic powder in such a manner, for example, that a soluble silicon compound is added into a dispersion solution prepared by dispersing magnetic powder into an aqueous alkali solution.

The above-mentioned silicon compounds include, for example, silicic acid such as orthosilicic acid $H_4SiO_4$, metasilicic acid $H_2SiO_3$, metabisilicic acid $H_2Si_2O$, metatrisilicic acid $H_4Si_3O_8$, metatetrasilicic acid $H_6Si_4O_{11}$; silicon monoxide and silicon dioxide; and matal silicates such as sodium orthosilicate $Na_4SiO_4$, sodium metasilicate $NaSiO_3$, potassium metasilicate $K_2SiO_3$, calcium orthosilicate $Ca_4SiO_4$, calcium metasilicate $Ca_2SiO_3$, barium metasilicate $Ba_2SiO_3$ and cobalt metasilicate $Co_2SiO_3$.

These silicon compounds may be used independently or in combination.

When aluminium is conatained in cobalt-containing iron oxide magnetic powder, an aluminium content of such magnetic powder is within the range of 0.001 to 0.30% by weight and, preferably, 0.01 to 0.25 % by weight. If such aluminum content of magnetic powder is less than 0.001% by weight, the surface activity of magnetic powder may not be enahnced to inhibit the magnetic powder from adsorbing to the polyurethane of the invention. On the other hand, even if it exceeds 0.30% by weight, there may be some instances where an effect may not be displayed as much as the content thereof is increased and, contrarily, the deterioration of magnetic properties may be caused.

Aluminium may be made adhere to cobalt-containing iron oxide magnetic powder in such a manner, for example, that a soluble aluminium compound is added into a dispersed solution comprising magnetic powder dispersed in an aqueous alkali solution.

Such aluminium compounds include, for example, aluminium oxide $Al_2O_3$.

When adding silicon and aluminum together into cobalt-containing iron oxide magnetic powder, the total contents of the both materials in the magnetic powder should be within the range of, preferably, 0.011 to 0.90% by weight and, more preferably, 0.011 to 0.70% by weight. If the total contents of the both materials in the magnetic powder is less than 0.11% by weight, the surface activity of the magnetic powder may not be enhanced and the magnetic powder is liable to be inhibited from adsorbing to polyurethane of the invention. On the other hand, even if exceeding 0.90% by weight, there may be some instances where an effect may not be displayed as much as the contents may be increased and, contrarily, magnetic properties may be deteriorated.

When using silicon Si and aluminium Al in combination, the proportion of silicon Si to aluminium Al should be within the range of, usually, 30:1 to 1:30 and, preferably, 20:1 to 1:10.

Cobalt-containing iron oxide magnetic powder may also be prepared by bringing magnetic powder into contact with gas containing aluminium and/or silicon.

It is preferred that aluminium and/or silicon should be present in the form of an oxide or a hydrated oxide on the surface area of cobalt-containing iron oxide magnetic powder.

When forming a double-coated layer comprising a coat of a compound containing aluminium and the other coat of a compound containing silicon over the surface of cobalt-containing iron oxide magnetic powder particles, it does not matter which coat is to be coated on first. However, when the coat of a compound containing aluminium is arranged onto the upper side, a durability is particularly improved. The reasons thereof are that the coat of a compound containing silicon has an excellent bonding force to both of the surface of magnetic powder particles and the coat of a compound containing aluminium so that the above-mentioned double-coated layer may strongly bond to the magnetic powder, and that te hardness of the compound containing aluminium is stronger than the compound containing silicon so that the surface hardness of the magnetic powder particles may more be enhanced.

When containing both of aluminium and silicon into cobalt-containing iron oxide magnetic powder, it is allowed to contain both of the alminium and silicon into each magnetic powder particle, or to prepare a mixture of magnetic particles containing aluminium but not containing silicon and magnetic particles containing silicon but not containing aluminium.

In the former case where both of aluminium and silicon are made present on each of the magnetic powder surfaces, the local unevenness of the durability may more be diminished in the surface areas of a magnetic layer. In the latter case, on the other hand, a step of making aluminium and silicon adhere to magnetic powder may be performed only once, but it does not need to try again.

Now, 'ferromagnetic chromium dioxide powder' applicable to the invention will be detailed.

Ferromagnetic chromium dioxide powder is characterized in that a filling property is excellent and any crystal defect which may cause a drop-out or noise is not produced. In addition, it has been known that the use of $CrO_2$ will reduce frinction and make the runnability excellent than in the use of others as a ferromagnetic material, when using a polyurethan resin as a binder for a magnetic layer.

A coercivity of magnetic powder should preferably be within the range of 600 to 1200 Oe. A specific surface area thereof should be within the range of, preferably, 15 to 60 $m^2/g$, more preferably, not less than 30 $m^2/g$ and, further preferably, not less than 35 $m^2/g$, each in terms of BET values. A saturation-magnetization should preferably be within the range of 60 to 70 emu/g. An average particle-size should preferably be within the range of the order of 0.1 to 0.8 $\mu m$ in the longer axial direction and 0.01 to 0.2 $\mu m$ in the shorter axial direction. An acicular ratio should preferably within the range of the order of 2/1 to 20/1.

Now, the magnetic metal powder applicable to the invention will be detailed. Such magnetic metal powder applicable to the invention are those containing iron and aluminium in a proportion within the range of 100:1 to 100:20 in terms of the number of atoms.

By specifying a proportion of an iron atom content to an aluminium atom content in magnetic metal powder to be within the range of 100:1 to 100:20, an iron type metal magnetic powder may be so provided as to have a satisfactory iron atom content and excellent electrical properties and, at the same time, a corrosion resistance that is a special feature of aluminium atom may satisfactorily be displayed because the aluminium atom content is abundant. The above-mentioned range of the proportion of the contents, iron atom:aluminium atom, should more preferably, be between 100:1 and 100:8.

It is also desired that the above-mentioned magnetic metal powder should have a BET specific surface area of not narrower than 45 $m^2/g$.

When a large amount of iron atoms are present on the surface area of a magnetic metal powder, however, it is apprehended that a dispersibility may be lowered and ultimately the durability of a medium may be deteriorated because individual particles are liable to oxidation and to cohere together and also because the powder is of metal-made and has a high specific surface area. Therefore, if an aluminium content in the surface area of the magnetic metal powder is satisfactorily increased, the corrosion resistance of the aluminium atom may fully be displayed and the oxidation of the magnetic powder may be prevented from progressing. Thereby the dispersibility of the particles may also be improved.

Because the above-mentioned aluminium atoms are in the state where they are bonding to oxygen atoms, the active sites present on the individual particle surfaces of magnetic powder may be reduced and the surface activity may also be inhibited from enhancing. Therefore, the corrosion resistance and dispersibility of magnetic metal powder may be further improved and the durability of the medium may also be improved.

The preferable magnetic metal powder should be that prepared in a dry-reduction process in which iron oxide is reduced by oxygen or the like. The excellent electrical properties and high durability of the invention may hardly be obtained from any metal powder prepared in a wet-reduction process in which iron oxide is reduced by hydrogenated boron or the like.

The magnetic metal powder applicable to the invention include, for example, those of Fe-Al type, Fe-Al-Zn type, and Fe-Al-Co type.

Iron-aluminium type magnetic metal powder applicable to the magnetic recording media of the invention may be prepared by, for example, reducing iron hydrates such as $\alpha$-FeOOH and $\gamma$-FeOOH, or iron oxides such as $\alpha$-Fe$_2$O$_3$, $\gamma$-Fe$_2$O$_3$ and Fe$_3$O$_4$, by making use of H$_2$ or the like, at a high temperature.

For example, a magnetic metal powder may be prepared in such a manner that, after a ferrous compound such as FeSO$_4$ or FeCl$_2$s is reacted with an alkali component such as NaOH, $\alpha$-FeOOH is produced and is then reduced by, for example, H$_2$, at a high temperature; or that, after $\alpha$-FeOOH is converted into $\alpha$-Fe$_2$O$_3$, the $\alpha$-Fe$_2$O$_3$ is the reduced by, for example, H$_2$, at a high temperature. An Al compound such as sodium aluminate may be added in any one of the above-mentioned stages, if required. Besides the Al compounds, the compounds of the other elements than Fe may be added in the same manner.

Magnetic recording media of the invention have the following distinguished characteristics.

The functional group being contained in polyurethane of the invention forms an intramolecular salt. Therefore, the functional group adsorbed smoothly to each surface of various kinds of magnetic powder as mentioned before and the time required to disperse the magnetic powder may be shortened and, further, the dispersing stability may be improved. Thereby, the magnetic powder including, particularly those highly fine-grained, may be filled more densely and uniformly into a magnetic layer, and the output and S/N ratio may also be improved.

The reasons thereof may be presumed at least as follows.

The surface of magnetic powder is complicated and positively and negatively charged due to the structural defect, ion-exchange as well as to the hydroxyl group originated from a hydration on the surface of the magnetic powder. For the selection of a binder applicable to magnetic powder, the acidic and basic properties of magnetic powder surfaces, the acidic and basic strength, the number of acidic and basic points, and so forth should therefore be essential factors.

It is ideal that magnetic powder should be uniformly dispersed within a short time in such a manner that a binder containing acidic or basic polar groups having various strengths is used so as to make these acidic and basic points adsorb to the surface active site of the magnetic powder.

However, only the introduction of the same polar functional groups into a binder has been far from the above-mentioned ideal.

On the other hand, it may also be considered that a binder containing a polar functional group is used and, at the same time, another binder containing a functional groups each having the same polarity and the different strengths is used in combination. In this case, however, magnetic powder competitively adsorbs prefernetially to the side of the binder containing a functional group having a higher strength and, on the whole, a satisfactory adsorption may hardly be produced so that the dispersing stability of a magnetic paint is deteriorated. It may further be considered that a binder containing a polar functional group is used and, at the same time, another binder containing the different polar functional group is also used in combination. However, in this case, the interaction between the polar groups is getting stronger and the adsorption of the binder to the surface of magnetic powder is hardly be produced and, in addition, the viscosity of the magnetic paint is increased, so that the magnetic paint cannot be prepared.

This invention aims at the settlement of the above-mentioned problems. It is believed to be that the adsorption of a binder to magnetic powder can be higher and the dispersibility can also remarkably be improved, because the acidic and basic points in the intramolecular salt of the binder can adsorb to the surface active sites, i.e., the basic and acidic points, of magnetic powder and, in addition to the above, there is not any problems mentioned above raised, because the anionic functional group of the same binder forms an intramolecular salt.

When dispersing magnetic powder into polyurethane of the invention, a moisture content of the magnetic powder is meaningful.

When properly adjusting the moisture content thereof, the number of the surface active sites, i.e., the acidic and basic points of the moisture, of the surface of the magnetic powder can be controlled and the interaction between the acidic and basic points of polyurethane of the invention and the surface of the magnetic powder can also be enhanced. It may be considered that the dispersibility of the magnetic powder can remarkably be improved thereby. If a moisture content of the surface of the magnetic powder is too small, the interaction between the magnetic powder surface and the polar group of polyurethane of the invention can not satisfactorily be performed, so that the special features of the above-mentioned polyurethane can hardly be displayed. On the other hand, if the moisture content of magnetic powder exceeds 2.0% by weight, the moisture is dispersed into a magnetic paint during the dispersion and the dispersed moisture and the polar group of the polyurethane are interacted together, so that the polyurethane adsorption to the magnetic powder surface will be weakened.

It is preferable that a moisture content of magnetic powder should be within the range of 0.1 to 2.0% particularly 0.2 to 1.8%, by weight.

A moisture content of magnetic powder can be measured by the following manner. A magnetic powder sample is weighed and is then dried at 110° C. for 1 hour. Immediately after the magnetic sample is dried, it is weighed again. A moisture content cna be obtained in terms of a weight percentage in the following formula.

Moisture content (at wt %) =

$(X/$ the initial weight of a magnetic powder sample$) \times 100$ wherein X represents a loss in weight of the magnetic powder sample.

Now, the whole constitution of a magnetic recording medium of the invention will be detailed.

Besides the 'polyurethane in which an anionic functional group forms an intramolecular salt', other known binders may be applicable to the invention.

Such applicable binders are those having an average molecular weight within the range of about 10000 to 200000. They may be exemplified by the following binders, namely, a urethane resin, a vinyl chloride-vinyl acetate copolymer, a vinyl chloride-vinylidene chloride copolymer, a vinyl chloride-acrylonitrile copolymer, a butadiene-acrylonitrile copolymer, a polyamide resin, a polyvinyl butylal, a cellulose derivative such as cellulose acetatebutylate, cellulose diacetate, cellulose triacetate, cellulose propionate, and nitrocellulose, a styrene-butadiene copolymer, a polyester resin, various types of synthetic rubbers, a phenol resin, an epoxy resin, a urea resin, a melamine resin, a phenoxy resin, a silicone resin, an acryl type reactive resin, a mixture of a high molecular-weight polyester resin and an isocyanate prepolymer, a mixture of a polyester polyol and a polyisocyanate, a urea formaldehyde resin, a mixture of a low molecular-weight glycol/a high molecular-weight diol/an isocyanate, and the mixtures thereof.

It is preferred that the above-given resins should be those containing a hydrophilic polar group including, for example, $-SO_3M$, $-OS_3OM$, $-COOM$, $-PO(OM')_2$, and $-PO_4M_2$, provided, M represents a hydrogen atom or an alkali metal such as lithium, potassium, or sodium, and M' represents a hydrogen atom, an alkali metal such as lithium, potassium, and sodium, or a hydrocarbon residual group. The reasons are that such a resin may be improved on the affinity to magnetic powder by the polar group being contained in molecules and, thereby, the dispersibility of the magnetic powder may further be improved and, at the same time, the cohesion of the magnetic powder may also be prevented and the stability of a magnetic paint may be more improved. These improvements can also lead a medium to durability improvement.

It is preferable that the 'polyurethane in which an anionic functional group forms an intramolecular salt' of the invention should be used jointly with the above-given resins and, inter alia, a vinyl chloride resin, and a vinyl chloride type copolymer such as a vinyl chloride-vinyl acetate copolymer. In that case, a proportion of the polyurethane of the invention to a vinyl chloride or a vinyl chloride type copolymer should be within the range of, preferably, 2:8 to 8:2 and, more preferably, 3:7 to 7:3. As for the vinyl chloride copolymers, those containing the above-mentioned hydrophilic polar group should particularly preferable.

The jointly applicable binders and, particularly, vinyl chloride type copolymers may be prepared by copolymerizing a vinyl chloride monomer, a copolymerizable monomer containing the alkali salts of sulfonic acid or phosphoric acid and, if required, other copolymerizable monomers. These copolymers may readily be prepared because a vinyl synthesization is applied, and various copolymeric components may be selected, so that the characteristics of the copolymers may be optimized.

The metals of the above-mentioned sulfonates and phosphates are alkali metals such as sodium, potassium and lithium. Among them, potassium is particularly preferable from the viewpoints of solubility, reactivity, yield, and so forth.

The above-mentioned copolymerizable monomers containing sulfonates include, for example,
$CH_2=CHSO_3M$,
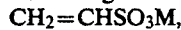$CH_2=CHCH_2SO_3M$,
$CH_2=C(CH_3)CH_2SO_3M$,
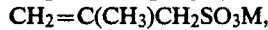$CH_2=CHCH_2OCOCH(CH_2COOR)SO_3M$,
$CH_2=CHCH_2OCH_2CH(OH)CH_2SO_3M$,
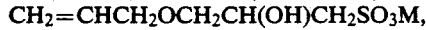$CH_2=C(CH_3)COOC_2H_4SO_3M$,
$CH_2=CHCOOC_4H_8SO_3M$, and
$CH_2=CHCONHC(CH_3)_2CH_2SO_3M$;
and those containing phosphates include, for example,
$CH_2=CHCH_2OCH_2CH(OH)CH_2-O-PO_3MY^2$,
$CH_2=CHCONHC(CH_3)_2CH_2-O-PO_3MY^2$,

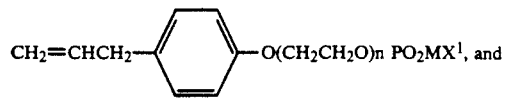

$CH_2=CHCH_2O(CH_2CH_2O)m\ PO_2MX^2$;
wherein M represents an alkali metal:
R represents an alkyl group having 1 to 20 carbon atoms;
$Y^1$ represents H, M or $CH_2=CHCH_2OCH_2CH(OH)CH_2-$;
$Y^2$ represents H, M or $CH_2=CHCONHC(CH_3)_2CH_2-$;
$X^1$ represents

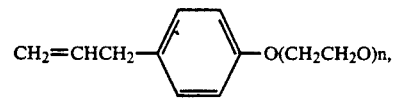

OH or OM;
$X^2$ represents $CH_2=CHCH_2O(CH_2CH_2O)m-$, OH or OM;
n is an integer of 1 to 100; and
m is an integer of 1 to 100.

The copolymerizable monomers which may be copolymerized if required include well-known polymerizable monomers such as followings. Namely, various vinyl esters, vinylidene chloride, acrylonitrile, methacrylonitrile, styrene, acrylic acid, methacrylic acid, various acrylic acid esters, methacrylic acid esters, ethylene, propylene, isobutene, butadiene, isoprene, vinyl ether, aryl ether, aryl esters, acrylamide, methacrylamide, maleic acid, and maleic acid esters.

The above-given binders may be polymerized in such a polymerization process as an emulsification-polymerization, a suspension-polymerization, or a bulk-polymerization. In any one of the above processes, a molecular-weight controlling agent, a polymerization initiator, and such a well-known techniques as those of a partial or continuous addition of monomers may be applied to the binders, if required.

A proportion of the monomers containing the salts of the above-mentioned acid groups to the above-mentioned binders should preferably be within the range of 0.01 to 30 mol %. If the proportion thereof is excessive, the binder is worsened in solubility to a solvent and is liable to gelation. If it is too short, desired characteristics may not be obtained.

Is is preferable that the above-mentioned vinyl chloride type copolymers further contain an epoxy or hydroxyl group.

A vinyl chloride type resin having at least one kind of hydrophilic group selected from the group consisting of COOM, $SO_3M$, $SO_4M$, $PO_3M$, and $PO_4M$, and an epoxy group may preferably be used in the invention. Such vinyl chloride resins may be prepared in the following processes. 1) A method in which a radical-polymerizable monomer having a hydrophilic group in point, and a monomer having an epoxy group and, if required, together with other copolymerizable monomer, are copolymerized with vinyl chloride; 2) another method in which a monomer having an epoxy group and, if required, together with other copolymerizable monomer are polymerized with vinyl chloride by making use of a radical producer having a hydrophilic group in point; and 3) a further method in which a copolymer consisting of a monomer having an epoxy group, vinyl chloride and, if required, other monomer, are partially reacted with a compound having a hydrophilic group in point. It is further allowed to use these methods in combination.

The monomers each having an epoxy group are used for preparing a vinyl chloride type resin having a hydrophilic group and an epoxy group. Such monomers may be exemplified as follows. Namely, glycidyl ethers of unsaturated alcohol, such as allylglycidyl ether: glycidyl esters of unsaturated acids, such as glycidyl acrylate, glycidyl methacrylate, glycidyl-p-vinyl benzoate, methylglycidyl itaconate, glycidylethyl maleate, glycidylvinyl sulfonate and glycidyl(metha)allyl sulfonate; and epoxide olefins such as butadiene monooxide, vinylcyclohexene monooxide and 2-methyl -5,6-epoxy hexene.

Among the manufactures of the vinyl chloride type resins applicable for the magnetic media of the invention, as to the examples of the monomers each having a hydrophilic group prepared in Method 1) monomers having COOM group include example, unsaturated monocarboxylic acids such as acrylic acid and methacrylic acid, unsaturated dicarboxylic acids such as fumaric acid and itaconic acid, and the monoesters thereof.

The monomers having $SO_3M$ group include, for example, acids such as vinylsulfonic acid, methylvinylsulfonic acid, (metha)allylsulfonic acid, styrenesulfonic acid, 2-sulfoethyl(metha)acrylate, 2-acrylamido-2-methylpropanesulfonic acid and 3-allyloxy-2-hydroxypropanesulfonic acid, and the alkali-metal salts or ammonium salts of the above-given acids. The monomers having $SO_4M$ group include, for example, acids such as (metha)acrylic acid-2-sulfuric acid ethyl, and 3-allyloxy-2-hydroxypropane sulfuric acid, and the alkalimetal salts or ammonium salts of the above-given acids.

The monomers having $PO_4M_2$ group include, for example, acids such as (metha)-3-chloro-2-phosphopropyl(metha)acrylate, 2-phosphoethyl(metha)acrylate and 3-allyloxy-2-hydroxypropanephosphoric acid, and the alkali-metal salts or ammonium salts of the above-given acids. The monomers having $PO_3M_2$ group include, for example, acids such as vinylphosphoric acid, acrylamidomethanephosphoric acid, 2-phosphoric acid ethyl-(metha)acrylate, and 3-allyloxy-2-hydroxypropanephosphoric acid, and the alkali-metal salts or ammonium salts of the above-given acids.

As for the examples of the radical generating compounds each having a hydrophilic group, prepared in the above-mentioned prepartion method 2), the compounds having COOM group include, for example, 4,4'-azobis-4-cyanovaleric acid. The compounds having $SO_4M$ group include, for example, potassium persulfate, and ammonium persulfate. The compounds having $PO_4M_2$ group include, for example, potassium perphosphate and sodium perphosphate.

Further, among the compounds so reacted in the above-mentioned method 3) with a copolymer of a monomer having an epoxy group and vinyl chloride as to be used for introducing a hydrophilic group into resins, the compounds having COOM group include, for example, malonic acid, and phthalic acid; the compounds having $SO_3M$ group include, for example, sodium sulfite, ammonium sulfite, sodium bisulfite, potassium bisulfite, ammonium thiosulfate, taurine sodium, sodium sulfanilate, and sodium sulfamate; the compounds having $SO_4M$ group include, for example, sodium bisulfate, ammonium bisulfate, and sodium 2-aminoethylsulfate; the compounds having $PO_3M_2$ group include, for example, sodium hydrogenphsphite, and ammonium hydrogenphosphite; and the compounds having $PO_4M_2$ group include, for example, dipotassium hydrogenphosphate and disodium hydrogenphosphate.

The monomers, which may be used if required and are other than the monomers each having an epoxy group, vinyl chloride, and the monomers each having a hydrophilic group, may be exemplified by carboxylic acid vinyl esters such as vinyl acetate, and vinyl propionate; vinyl ethers such as methylvinyl ether, isobutylvinyl ether, and cetylvinyl ether; vinylidenes such as vinylidene chloride and vinylidene fluoride; unsaturated carboxylic acid esters such as diethyl maleate, butylbenzyl maleate, di-2-hydroxyethyl material, dimethyl itaconate, methyl (metha)acrylate, ethyl (metha)acrylate, lauryl (metha)acrylate, and 2-hydroxypropyl(metha)acrylate; olefins such as ethylene and propylene; unsaturated nitriles such as (metha)acrylonitrile; and aromatic vinyls such as α-methylstyrene, and p-methylstyrene. The above-given monomers may suitably be selected to satisfy the purposes of improving the solubility of resins while controlling the solubility and softening points of both the resin of the invention and other resins so as to be compatible with each other when mixing them up and, in addition, to satisfy the requirements for improving the characteristics of coated layers and the coating processes.

A copolymerization of a monomer having an epoxy group and vinyl chloride, and a polymerization of a monomer having an epoxy group, a monomer having a hydrophlipc group, and vinyl chloride, including a further polymerization of the above monomers and other monomers, may be carried out in an ordinary copolymerization process. A reaction of a copolymer of a monomer having an epoxy group, vinyl chloride and, if required, other monomers with a compound having a hydrophilic group may also be carried out in an ordinary process, depending on the characteristics of the materials used and a process of separating the matters produced.

About the introduction of polar groups into a vinyl chloride type copolymers, there are descriptions in, as indicated before, for example, Japanese Patent O.P.I. Publication Nos. 57-44227(1982), 58-108032(1983), 59-8127(1984), 60-101161(1985), 60-235814(1985), 60-238306(1985), 60-238309(1985) and 60-238371(1985). For the invention, these introduction methods described therein may be utilized.

In a hydrophilic group bonding to a vinyl chloride copolymer having at least one kind of hydrophilic groups selected from the group consisting of thus prepared COOM, $SO_3M$, $SO_4M$, $PO_3M_2$, and $PO_4M_2$ and an epoxy group, an amount of such hydrophilic group should be within the range of 0.05 to 4.0 wt % in terms of —COO, —$SO_3$, —$SO_4$, —$PO_4$, or —$PO_3$. If such an amount is less than 0.05 wt %, the dispersibility of magnetic powder becomes unsatisfactory. If exceeding 4.0 wt %, not only the solubility to a solvent becomes unsatisfactory because the hydrophilic property of the resin used is enhanced, but also the moisture resistance of a coated layer is lowered and the resins cohere together so as contrarily to worsen the dispersibility of the resins.

In the invention, it is preferred that a vinyl chloride type resin has an epoxy group in an amount of not less than 0.05 wt %.

In the invention, a copolymerized resin is to have an average degree of polymerization within the range of 100 to 900 and, preferably, 200 to 500, and to have a vinyl chloride content of not less than 60 wt %. If a polymerization degree is less than 100, the abrasion resistance of a mgnetic layer becomes unsatisfactory, and if exceeds 900, the viscosity of a paint becomes higher and the dispersibility of magnetic powder ia liable to be unsatisfactory. If a vinyl chloride content is less than 60 wt %, there causes such an inconvenience that the compatibility with a flexible binder may be lowered or a solvent-separation from a coated layer may seriously be deteriorated.

The above-mentioned copolymerized resins are of the hydrophilic. Therefore, the dispersibility of magnetic powder can be much bettwe improved than those of the conventional vinyl chloride copolymer resins. This result is remarkably shown in the case where fine-grained oxidized magnetic powder or fine-grained magnetic metal powder is used.

The above-mentioned mixing proportion of the vinyl chloride copolymer relating to the invention to poly-urethane forming an intramolecular salt is within the range of 8/2 to 2/8 and, more preferably, 7/3 to 4/6.

It is also preferable to use 'polyurethane in which an anionic functional group forms an intramolecular salt' and an epoxy resin such as particularly a phenoxy resin, a polyester type resin, or a nitrocellulose resin (hereinafter called 'other resins') in combination. In this case, it is desirable that a compounding proportion of the above-mentioned urethane resin to other resin is within the range of 90 to 10 parts by weight for the other resin and, more preferably, 80 to 20 parts by weight therefor, respectively. If the above-mentioned compounding proportion exceeds 90 parts by weight for other resin, a coated layer becomes so fragile as to deteriorate the coated layer durability and the adhesive property to a support is also worsened. If the above-mentioned compounding proportion is less than 10 parts by weight, magnetic powder is liable to fall off.

From the viewpoints of improving a runnability and electromagnetic conversion characteristics, it is further advantageous to jointly add carbon black into a magnetic layer, and a dispersibility may also be improved to some extent and a remaining solvent may be more removed from the magnetic layer.

When using such a carbon black as that for light-shielding use, a light-shielding degree of the magnetic recording layer may be improved. Such light-shielding carbon blacks applicable to this purpose include, for example, Raven 2000 having a specific surface area of 190 m²/g and a particle-size of 18 mμ manufactured by Columbia Carbon Company, id. 2100, 1170, 1000; and #100, #100, #75, #40, #35, #30 and so forth each manufactured by Mitsubishi Chemical Industrial Company.

Condusctive carbon blacks include, for example, Conductex having a BET value (hereinafter simply called BET) of 250 m²/g, a DBP oil-absorption (hereinafter simply called DBP) of 170 ml/100 gr, and a particle-size of 24 mμ, Conductex 900 having BET of 125 m²/g and a particle-size of 27 mμ. Conductex 40-220 having a particle-size of 20 mμ, and Conductex SC having BET of 220 m²/gr, DBP of 115 ml/100 gr, and a particle-size of 20 mμ, each manufactured by Columbian Carbon Company: Vulcan XC-72 having a specific surface area of 254 m²/g, and a particle-size of 30 mμ, and Vulcan P having a BET of 143 m²/gr, a DBP of 118 ml/100 gr, and a particle-size of 20 mμ, each manufactured by Cabot Company; Raven 1040, id., 420, each manufactured by Columbian Carbon Company; and Black Pearls 2000 having a particle-size of 15 mμ; and #44 manufactured by Mitsubishi Chemical Industrial Company.

'Other carbon blacks' applicable to the invention include, for example, Vulcan 9 having a BET of 140 m²/g, a DBP of 114 ml/100 g, and a particle-size of 19 mμ, manufactured by Cabot Company; #80 having a BET of 117 m²/g, a DBP of 113 ml/100 g, and a particle-size of 23 mμ, manufactured by Asahi Carbon Company; HS-100 having a BET of 32 m²/g, a DBP of 180 ml/100 g, and a particle-size of 53 mμ, manufactured by Denki Kagaku Company: #22B having a BET of 55 m²/g, a DBP of 131 ml/100 g, and a particle-size of 40 mμ, #20B having a BET of 56 m²/g, a DBP of 115 ml/100 g, and a particle-size of 40 mμ, and #3500 having a BET of 47 m²/g, a DBP of 187 ml/100 g, and a particle-size of 40 mμ, each manufactured by Mitsubishi Chemical Industrial Company: and besides the above, CF-9, #4000, and MA-600, each manufactured by Mitsubishi Chemical Industrial Company: Black Pearls L. Monarck 800, Black Pearls 700, Black Pearls 1000, Black Pearls 880, Black Pearls 900, Black Pearls 1300, Black Pearls 2000, and Sterling V, each manufactured by Cabot Company; Raven 410, Raven 3200, Raven 430, Raven 450, Raven 825, Raven 1255, Raven 1035, Raven 1000, Raven 5000, and Ketchen Black FC. Such carbon blacks may be added preferably in an amount within the range of 0.1 to 10.0 parts by weight per 100 parts by weight of magnetic powder used.

In the invention, when further adding a polyisocyanate type hardener to a magnetic paint containing a binder, the durability may be improved. Such polyisocyanate hardeners applicable thereto include, for example, bifunctional isocyanates such as tolylene isocyanate, diphenylmethane diisocyanate, and hexane diisocyanate; trifunctional isocyanates such as Colonate L manufactured by Japan Polyurethane Industrial Company, and Desmodule L manufactured by Bayer AG.; or those having so far been used as a hardener, such as a urethane prepolymer containing isocyanate group at each of the terminals; and any polyisocyanates, provided they may be used as a hardener. Such polyisocyanate type hardenerd may be used in an amount within the range of 5 to 80 parts by weight to the whole amount of binders used.

A magnetic recording medium of the invention has such a construction as shown in FIG. 1, wherein magnetic layer 2 is arranged onto non-magnetic support I such as those made of polyethyleneterephthalate and, if required, BC layer 3 may be arranged to the opposite side of the magnetic layer 2. Further, as shown in FIG. 2, an over-coat layer 4 (hereinafter sometimes called an OC layer) may be arranged onto magnetic layer 2 of the magnetic recording medium shown in FIG. 1.

Figure 2:
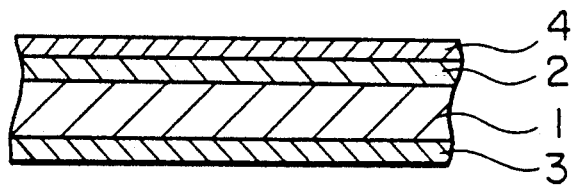

Both of the magnetic recording media shown in FIGS. 1 and 2 are allowed to have a subbing layer (not shown) between magnetic layer 2 and support 1, or not to have any subbing layer. The support may be subjected to a corona-discharge treatment.

Magnetic layer 2 is allowed to contain, besides the above-mentioned magnetic powder and binders, a fatty acid and/or a fatty acid ester as a lubricant. When this is the case, it is possible to offset the defects caused in the case of a single application of one of those lubricants so as to improve the lubrication effects and to enhance a still-flame durability, running stability, S/N ratio and so forth, while displaying every special feature of both additives. In this case, a fatty acid may be added in an amount within the range of 0.2 to 10 parts by weight per 100 parts by weight of magnetic powder used and, preferably, 0.5 to 8.0 parts by weight. If an amount of fatty acid added is smaller than in the above-mentioned range, the dispersibility of magnetic powder :s lowered and the runnability of a medium is apt to be lowered. If exceeding the range, fatty acid may ooze out or an output is apt to be lowered. On the other hand, an amount of fatty acid esters added may be within the range of 0.1 to 10 parts by weight to 100 parts by weight of magnetic powder and, more preferably, 0.2 to 8.5 parts by weight. If an amount of the esters added is smaller than in the above-mentioned range, the effect of the runnability improvement is little. If exceeding the range, the esters may ooze out and an output is apt to be lowered.

From the viewpoint of making the above-mentioned effects more excellent, a weight-ratio of a fatty acid to a fatty acid ester should preferably be within the range of a fatty acid/a fatty acid ester = 10/90 to 90/10. Further, such fatty acids may be able to display an effect of dispersing function. It may, therefore, be considered that an amount of other low molecular-weight dispersant may be reduced by making use of the fatty acid so as to improve the Young's modulus of a magnetic recording medium as much as such a reduction of the other dispersant used.

Such fatty acids maybe of either the monobasic type or the dibasic type, however, they should have preferably 6 to 30 carbon atoms and, more preferably, 12 to 22 carbon atoms.

Such fatty acids may be exemplified as follows.

| | |
|---|---|
| (1) caproic acid, | (2) caprylic acid, |
| (3) capric acid, | (4) lauric acid, |
| (5) myristic acid, | (6) palmitic acid, |
| (7) stearic acid, | (8) isostearic acid, |
| (9) linolenic acid, | (10) linolic acid, |
| (11) oleic acid, | (12) elaidic acid, |
| (13) behenic acid, | (14) malonic acid, |
| (15) succinic acid, | (16) maleic acid, |
| (17) glutaric acid, | (18) adipic acid, |
| (19) pimelic acid, | (20) azelaic acid, |
| (21) sebacic acid, | (22) 1,12-dodecane dicarboxylic acid, and |
| (23) octanedicarboxylic acid. | |

The above-mentioned fatty acid esters may be exemplified as follows.

| | |
|---|---|
| (1) oleyl oleate, | (2) oleyl stearate, |
| (3) isocetyl stearate, | (4) dioleyl maleate, |
| (5) butyl stearate, | (6) butyl palmitate, |
| (7) butyl myristate, | (8) octyl myristate, |
| (9) octyl palmitate, | (10) amyl stearate, |
| (11) amyl palmitate, | (12) isobutyl oleate, |
| (13) stearyl stearate, | (14) lauryl oleate, |
| (15) octyl oleate, | (16) isobutyl oleate, |
| (17) ethyl oleate, | (18) isotridecyl oleate, |
| (19) 2-ethylhexyl-myristate, | (20) 2-ethylhexyl-myristate, |
| (21) ethyl stearate, | (22) 2-ethylhexyl palmitate, |
| (23) isopropyl palmitate, | (24) isopropyl myristate, |
| (25) butyl laurate, | (26) cetyl-2-ethyl hexarate, |
| (27) dioleyl adipate, | (28) diethyl adipate, |

-continued

| | |
|---|---|
| (29) diisobutyl adipate, | (30) diisodecyl adipate |

Besides the above-given fatty acids and fatty acid esters, other types of lubricants including, for example, silicone-oil which may be of the carboxylic acid-modified type or of the ester-modified type, graphite, fluorocarbon, molybdenum disulfide, tungsten disulfide, fatty acid amide, α-plefin oxide, may also be added to a magnetic layer.

Non-magnetic abrasive particles may further be added thereto. Such abrasives include, for example, α-alumina, chromium oxide, titanium oxide, α-iron oxide, silicon oxide, silicon nitride, silicon carbide, zirconium oxide, zinc oxide, cerium oxide, magnesium oxide, and boron nitride. An average particle-size of such abrasives should preferably be not larger than 0.6 μm and a Mohs' hardness thereof should preferably be not less than 5.

It is also allowed to add an antistatic agent such as graphite, and a dispersant such as powdered lecithin or a phosphoric acid ester into a magnetic layer and, further, carbon black may also be used in combination.

It is more preferable when a back-coat layer contains non-magnetic particles having an average particle-size within the range of 10 mμ to 1000 mμ, because they are not so finely powdered but can display an excellent addition effect, when their particle-size is within the above-mentioned range.

Such non-magnetic particles include, for example, those of silicon oxide, titanium oxide, aluminium oxide, chromium oxide, silicon carbide, calcium carbide, zinc oxide, α-$Fe_2O_3$, talc, kaolin, calcium sulfate, boron nitride, zinc fluoride, molybdenum dioxide, calcium carbide, and barium sulfate. Beside the above, organic powders such as benzoguanamine type resins, melamine type resins, and phthalocyanine type resins, may also be used. Further such organic powders and the foregoing inorganic powders may be used in combination.

It is further preferable to use carbon black together with the above-mentioned non-magnetic particles. If this is the case, the runnability of a medium may further be stabilized and the durability of the medium can further be improved by the combination with the functions of the above-mentioned non-magnetic particles.

It is rather preferable to make a magnetic layer thinner from the viewpoint of realizing a high S/N ratio, while it is preferable to make it thicker from the viewpoint of obtaining a high-durability in still frame test. The thickness of a magnetic layer should therefore be within the range of, preferably, 6.0 to 1.0 μm and, more preferably, 5.9 to 2.0 μm.

The surface roughness of the magnetic layer should preferably be within the range of 0.005 to 0.020 μm in terms of an average surface roughness Ra. If it is within the range, the runnability may not be lowered and the S/N ratio may also be improved.

The raw materials for producing the non-magnetic support include, for example, polyesters such as polyethyleneterephthalate, and polyethylene-2,6-naphthalate; polyolefins such as polypropylene; cellulose derivatives such as cellulose triacetate, and cellulose diacetate; plastics such as polycarbonate. It is, further, allowed to use metals such as Cu, Al, and Zn; glass; various kinds of ceramics such as the so-called new-ceramic, e.g., boron nitride and silicon nitride.

There is no special limitation to the forms of the above-mentioned non-magnetic supports. They may be in any forms, such as a tape, sheet, card, disk, drum, or the like. Various materials may selectively be used according to the forms and if occasion demands.

Usually, the thickness of the non-magnetic supports should be within the range of, preferably, 3 to 100 μm and, more preferably, 5 to 50 μm in the case that the support is in the sheet-form, and within the range of 30 to 100 μm in the case of the disk or card form. When it is in the drum-form, it may be in the cylindrical-form so as to suitably be used to a recorder.

For the purpose of improving the adhesive property of a non-magnetic support to a magnetic layer and the like properties, an interlayer such as an adhesive layer may also be arranged to the magnetic layer-coated surface of the support.

EXAMPLES

Now, some examples of the invention will be detailed.

In the following examples, the term, 'part(s)', herein means 'part(s) by weight'.

EXAMPLE 1

Preparation of Video-Tape

A magnetic layer was provided onto a 10-μm thick polyethylene terephthalate-base film support in the following manner.

A magnetic paints were each prepared by making use of the cobalt-containing magnetic iron oxide powders shown in The following Table-1 and by dispersing the resins and various kinds of the additives, each shown in Table-1. And, the magnetic layers having various compositions shown in Table-1 were prepared by filtrating the resulting magnetic paints through a 1-μm mesh filter and 7 parts of trifunctional isocyanate were added. The resulting coating solutions were coated on the supports so as to be 2.5 μm in thickness. The coated supports were subjected to super-calender treatments. Thus, the magnetic layers were prepared, respectively.

After that, the paint for BC layer use having the following composition was coated on the opposite side of each magnetic layer so as to be 0.4 μm in dried thickness.

| | |
|---|---|
| Carbon black | 40 parts |
| Barium sulfate | 10 parts |
| Cellulose nitrate | 25 parts |
| Polyurethane resin, N-2301, manufactured by Nippon Polyurethane Co. | 25 parts |
| Hardner, Colonate L, manufactured by Nippon Polyurethane Co. | 10 parts |
| Cyclohexanone | 400 parts |
| Methylethyl ketone | 250 parts |
| Toluene | 250 parts |

Thus, the wide-width magnetic films each having a specific-thick magnetic layer and BC layer were prepared and they were rolled round a reel. Those films were each cut by every ½-inch wide so as to make videotapes shown in Table-1, provided, the numeral figures shown in Table-1 represent 'part(s) by weight'.

TABLE-1

| | | Example | | | | | Comparison | | | |
|---|---|---|---|---|---|---|---|---|---|---|
| | | 1 | 2 | 3 | 4 | 5 | (1) | (2) | (3) | (4) |
| Co-absorbed-γ-Fe₂O₃, | A | 100 | — | — | — | — | — | — | — | 100 |
| | B | — | 100 | — | — | — | — | — | — | — |
| | C | — | — | 100 | — | — | — | — | 100 | — |
| | D | — | — | — | 100 | — | 100 | — | — | — |
| | E | — | — | — | — | 100 | — | 100 | — | — |
| Vinyl chloride type copolymer | | 15 | 12 | 12 | 12 | 14 | 12 | 14 | 12 | 15 |
| Polyurethane resin, | a | 15 | — | — | 12 | — | — | — | — | — |
| Invention | b | — | — | 16 | — | 13 | — | — | — | — |
| | c | — | 18 | — | — | — | — | — | — | — |
| Sulfonic acid-modified polyurethane resin | | — | — | — | — | — | 12 | — | — | — |
| Carboxylic acid-modified polyurethane resin | | — | — | — | — | — | — | — | 16 | — |
| Hydroxyl group cont'g polyurethane resin | | — | — | — | — | — | — | — | — | 15 |
| Phosphoric acid-modified polyurethane resin | | — | — | — | — | — | — | 13 | — | — |
| Dispersant, lecithin | | 2 | 2 | 3 | 3 | 3 | 3 | 3 | 3 | 2 |
| α-alumina | | 5 | 7 | 7 | 5 | 5 | 5 | 5 | 7 | 5 |
| Carbon black | | 8.0 | 6.0 | 1.0 | 0.5 | 0.3 | 0.5 | 0.3 | 1.0 | 8.0 |
| Stearic acid | | 1.5 | 2.0 | 1.0 | 1.5 | 1.5 | 1.5 | 1.5 | 1.0 | 1.5 |
| Butyl stearate | | 1.0 | 1.5 | 2.0 | 1.5 | 1.5 | 1.5 | 1.5 | 2.0 | 1.0 |
| Cyclohexanone | | 50 | 50 | 40 | 40 | 40 | 40 | 40 | 40 | 50 |
| Methylethyl ketone | | 90 | 60 | 80 | 110 | 100 | 110 | 100 | 80 | 90 |
| Toluene | | 90 | 100 | 80 | 90 | 100 | 90 | 100 | 80 | 90 |

In Table-1, Co-adsorbed-γ-Fe₂O₃ A through E have the following characteristics.

| | A | B | C | D | E |
|---|---|---|---|---|---|
| Coercive force, Oersted | 640 | 680 | 720 | 830 | 910 |
| Magnetic susceptibility, emu/g | 76.2 | 75.3 | 77.2 | 76.9 | 76.8 |
| Specific surface area, BET, m²/g | 26 | 32 | 41 | 51 | 62 |
| Particle-size in longer axis, μm | 0.4 | 0.4 | 0.3 | 0.2 | 0.2 |
| Axial ratio | 1:8 | 1:8 | 1:8 | 1:8 | 1:8 |
| Moisture content | 0.3 | 0.3 | 0.3 | 0.4 | 0.4 |

Polyurethane resins a through c each relating to the invention are as follows.

Polyurethane a relating to the invention was prepared in the method used for preparing the foregoing synthesis example, and those b and c were each synthesized in the same manner.

Polyurethane a which contains a sulfobetaine type modifying group
  Numeral average molecular weight: 22000,
  Tg: −20° C., Polar group content: 0.04 mmol/g,

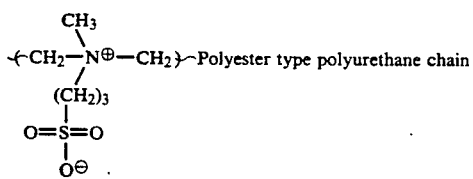

Polyurethane b which contains carboxybetaine type modifying group
Numeral average molecular weight: 15000,
Tg: −10° C.,
Polar group content: 0.1 mmol/g,

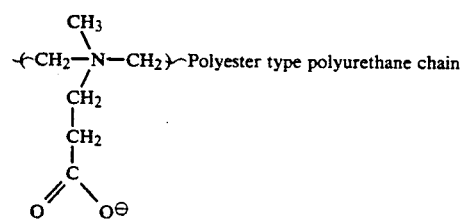

Polyurethane c which contains phosphobetaine type modifying group
Numeral average molecular weight: 30000,
Tg: 0° C.,
Polar group content: 0.07 mmol/g,

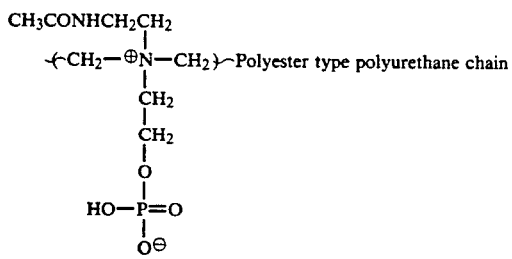

Evaluation of Video-Tape Performance

With respect to each video-tape shown in Table-1, the characteristic evaluations were made as shown in the following Table -2.

The methods of measuring each data evaluated were as follows.

Electromagnetic conversion characteristics

RF output:

Using the tape of Comparative Example (3) as the control tape, an output from the reproduction made by a 100% white signal was obtained in comparison with the output of the control tape.

Lumi-S/N:

Using a noise-meter manufactured by Shiba-Soku Co., and in comparison of the subject sample tapes with the control tape manufactured by Konica Corporation, the difference of S/N between the control tape and the samples each produced by a 100% white signal.

Chroma-S/N:

Using a noise-meter manufactured by Shiba-Soku Co., and in comparison of the subject sample tapes with the control tape manufactured by Konica Corporation, the difference of S/N between the control tape and the samples each produced by a chroma-signal.

Runnability and Durability

Jitter:

Measured by a VTR Jitter Maker, MK-612A manufactured by Meguro Dempa Co.

Still-Life:

Using an NV-6200 deck manufactured by Matsushita Electric Co., a period of time required until an RF output is lowered by 1 dB in the still-mode.

Using the unused sample tapes, i.e., the virgin tapes, the RF output variation, dynamic frictional coefficient, and drop-out thereof were measured, respectively. On the other hand, the sample tapes were each loaded in a VHS cassete and were then run 100 times repeatedly at a temperature of 20° C. and relative humidity of 60% RH by making use of an NV-6200 deck manufactured by Matsushita Electric Co., respectively. The resulting tapes each are hereinafter called a 100-time passed tape. The same measurements as above were made and, at the same time, the tapes were inspected for a tape damage.

Dynamic Frictional Coefficient:

Using a tape-runnability tester, TBT-300D manufactured by Yokohama System Laboratories. Inc., at a temperature of 25° C., a sample tape was wound 180° round a 4 $\phi$-chromium-plated stainless steel pin and the dynamic frictional coefficient thereof was measured by running the tape at a tape-speed of 1 cm/sec with an entrance tension of 20 g. The value of $\mu_k$ thereof was obtained by the following formula.

$$\lambda_k = \frac{1}{\pi} \ln \frac{x}{20}$$

in which x represents an entrance tension g

Drop-out:

Using a drop-out counter, VD-5M manufactured by Japan Victor Co., the whole length of each sample tape was measured to obtain an average drop-out, provided, it counted one drop-out when an output was not shrter than 15 μsec. and lowered by 20 dB or more than the output of an RF envelope.

TABLE-2

| | Example | | | | | Comparative Example | | | |
|---|---|---|---|---|---|---|---|---|---|
| | 1 | 2 | 3 | 4 | 5 | (1) | (2) | (3) | (4) |
| <Electromagnetic Conversion Characteristics> | | | | | | | | | |
| Limi-S/N (dB) | +0.2 | +0.4 | +0.5 | +0.8 | +0.9 | 0.0 | −0.5 | −0.6 | −0.9 |
| Chroma-S/N (dB) | +0.3 | +0.6 | +0.4 | +0.1 | +0.1 | +0.1 | 0.0 | −0.3 | −0.5 |
| Rf output (dB) | +0.5 | +0.6 | +0.5 | +0.7 | +0.8 | −0.2 | −0.2 | 0.0 | −0.3 |
| <Runnability and Durability> | | | | | | | | | |
| Jitter (μsec) | 0.06 | 0.06 | 0.06 | 0.06 | 0.07 | 0.09 | 0.07 | 0.06 | 0.07 |
| Still-life (min) | >60 | >60 | >60 | >60 | >60 | 35 | 50 | 40 | >60 |
| <100-passed Tape> | | | | | | | | | |
| Rf output fluctuation (dB) | ±0.3 | ±0.4 | ±0.3 | ±0.3 | ±0.2 | ±0.7 | ±0.9 | ±0.6 | ±0.5 |

TABLE-2-continued

|  | Example | | | | | Comparative Example | | | |
| --- | --- | --- | --- | --- | --- | --- | --- | --- | --- |
|  | 1 | 2 | 3 | 4 | 5 | (1) | (2) | (3) | (4) |
| Tape damage | none | none | none | none | none | none | many | many | many |
| Dynamic friction coefficient ($\mu k$) | 0.23 | 0.24 | 0.24 | 0.23 | 0.24 | 0.28 | 0.27 | 0.26 | 0.28 |
| Dropout (pce/sec) (15$\mu$/20 dB) | 5 | 7 | 9 | 8 | 7 | 13 | 15 | 19 | 20 |
| <Virgin Tape> | | | | | | | | | |
| Rf output fluctuation (dB) | ±0.0 | ±0.1 | ±0.2 | ±0.1 | ±0.1 | ±0.2 | ±0.2 | ±0.1 | ±0.3 |
| Dynamic friction coefficient ($\mu k$) | 0.22 | 0.22 | 0.23 | 0.22 | 0.21 | 0.25 | 0.24 | 0.25 | 0.26 |
| Dropout (pce/sec) (15$\mu$/20 dB) | 4 | 6 | 3 | 5 | 6 | 11 | 12 | 9 | 15 |

Samples 1 through 5 which were prepared by dispersing the polyurethane resins relating to the invention are superior to the samples (1) through (4) which were prepared by using conventional polyurethane resins, in the electromagnetic conversion characteristics including lumi-S/N, chroma-S/N and Rf output, jitter, and still-life. Samples 1 through 5 have not had any tape damages such as edge-crease and uneven fan-out (or elongation even after trying a running test and have also had small dynamic friction coefficient. In addition, samples 1 through 5 have had an output fluctuation within a narrow range and a drop-out in a low-level.

have a thickness of 4.0 $\mu$m and the coated support was subjected to a super-calender treatment, so that each of the magnetic layers having the various composition shown in Table-3 was formed.

Furthermore, the same BC layers as those of Example 1 were coated, respectively.

Each of the wide magnetic films comprising the magnetic layer and BC layer each having a specific thickness was prepared in the above-mentioned manner, and was then rolled round a reel. The resulting films was cut by every ½ inch-wide so as to make the video-tapes shown in Table-3. In Table-3, the numerals indicate each a part by weight.

TABLE-3

|  | Example | | | | Comparative Example | | | |
| --- | --- | --- | --- | --- | --- | --- | --- | --- |
|  | 11 | 12 | 13 | 14 | (15) | (16) | (11) | (12) |
| CO-absorbed-$\gamma$-Fe2O3 | | | | | | | | |
| F | 100 | — | — | — | — | — | — | — |
| G | — | 100 | — | — | — | — | — | 100 |
| H | — | — | 100 | — | — | — | 100 | — |
| J | — | — | — | 100 | — | — | — | — |
| K | — | — | — | — | 100 | — | — | — |
| L | — | — | — | — | — | 100 | — | — |
| Vinyl chloride type copolymer | 10 | 10 | 10 | 10 | 10 | 10 | 10 | 10 |
| Polyurethane resin of the invention | | | | | | | | |
| (a) | 10 | — | — | — | — | — | — | — |
| (b) | — | 10 | — | 10 | 10 | — | — | — |
| (c) | — | — | 10 | — | — | 10 | — | — |
| Sulfonic acid-modified polyurethane resin | — | — | — | — | — | — | 10 | — |
| Carboxylic acid-modified polyurethane resin | — | — | — | — | — | — | — | 10 |
| Dispersant: Lecithin | 2 | 2 | 2 | 2 | 2 | 2 | 2 | 2 |
| $\alpha$-alumina | 5 | 5 | 5 | 5 | 5 | 5 | 5 | 5 |
| Carbon black | 0.5 | 0.5 | 0.5 | 0.5 | 0.5 | 0.5 | 0.5 | 0.5 |
| Stearic acid | 1.5 | 1.5 | 1.5 | 1.5 | 1.5 | 1.5 | 1.5 | 1.5 |
| Butyl stearate | 1.5 | 1.5 | 1.5 | 1.5 | 1.5 | 1.5 | 1.5 | 1.5 |
| Cyclohexanone | 45 | 45 | 45 | 45 | 45 | 45 | 45 | 45 |
| Methylethyl ketone | 90 | 90 | 90 | 90 | 90 | 90 | 90 | 90 |
| Toluene | 90 | 90 | 90 | 90 | 90 | 90 | 90 | 90 |

EXAMPLE 2

Preparation of Video-Tape

A magnetic layer was first provided in the following manner onto a support comprising a 10 $\mu$m-thick polyethyleneterephthalate film.

Each of the magnetic paints was prepared by making use of the specific magnetic powder shown in the following Table-3 and dispersing the resins and various additives shown in Table-3. The resulting magnetic paint was filtrated through a 1 $\mu$m-mesh filter and was then added with 6 parts of trifunctional isocyanate. The resulting coating solution was coated on the support to The Co-$\gamma$-Fe$_2$O$_3$ magnetic powder shown in Table-3 has the following characteristics.

|  | F | G | H | J | K | L |
| --- | --- | --- | --- | --- | --- | --- |
| Silica content (wt %) | 0.030 | 0.100 | 0.550 | 0.01 | 0.005 | 0.650 |
| Aluminum content (wt %) | 0.000 | 0.010 | 0.200 | 0.250 | 0.000 | 0.330 |
| Magnetic coersivity (oe) | 680 | 720 | 710 | 850 | 910 | 920 |
| Specific surface | 30 | 41 | 38 | 47 | 49 | 62 |

-continued

|  | F | G | H | J | K | L |
|---|---|---|---|---|---|---|
| area (BET, m²/g) | | | | | | |
| Magnetized amount (emu/g) | 76.5 | 78.0 | 76.8 | 75.2 | 78.5 | 77.5 |
| Particle-size on longer axis (μm) | 0.4 | 0.3 | 0.25 | 0.3 | 0.25 | 0.20 |
| Axial ratio | 10:1 | 9:1 | 8:1 | 9:1 | 9:1 | 8:1 |

The polyurethane resins (a) through (c) each relating to the invention are the same as those in Example 1.

Each of the samples were evaluated in the same manner as in Example 1 and the results thereof were obtained as shown in the following Table -4.

EXAMPLE 3

Preparation of Video-Tape

A magnetic layer was first provided in the following manner onto a support comprising a 10 μm-thick polyethyleneterephthalate film.

Each of the magnetic paints was prepared by making use of the specific $CrO_2$ magnetic powder shown in the following Table-5 and then by dispersing the resins and various additives shown in Table-5. The resulting magnetic paint was filtrated through a 1 μm-mesh filter and was then added with 6 parts of trifunctional isocyanate. The resulting coating solution was coated on the support to have a thickness of 2.5 μm and the coated sup-

TABLE-4

|  | Example |  |  |  |  | Comparative Example |  |  |
|---|---|---|---|---|---|---|---|---|
|  | 11 | 12 | 13 | 14 | 15 | (16) | (11) | (12) |
| <Electromagnetic Conversion Characteristics> | | | | | | | | |
| Limi-S/N (dB) | +0.5 | +0.6 | +0.7 | +0.9 | +0.2 | +0.3 | +0.1 | −0.1 |
| Chroma-S/N (dB) | +0.2 | +0.1 | +0.3 | +0.2 | +0.1 | +0.1 | −0.2 | 0.0 |
| Rf output (dB) | +0.7 | +0.8 | +0.7 | +0.7 | +0.3 | −0.2 | 0.0 | +0.3 |
| <Runnability and Durability> | | | | | | | | |
| Jitter (μsec) | 0.06 | 0.06 | 0.07 | 0.07 | 0.08 | 0.09 | 0.10 | 0.07 |
| Still-life (min) | >60 | >60 | >60 | >60 | 35 | 260 | 52 | 38 |
| <100-passed Tape> | | | | | | | | |
| Rf output fluctuation (dB) | ±0.5 | ±0.4 | ±0.6 | ±0.6 | ±0.7 | ±1.1 | ±0.7 | ±0.9 |
| Tape damage | none | none | none | none | mere edge crease | none | slight uneven fanout | edge crease |
| Dynamic friction coefficient (μk) | 0.28 | 0.27 | 0.27 | 0.26 | 0.32 | 0.34 | 0.31 | 0.29 |
| Dropout (pce/sec) (15μ/20 dB) | 8 | 7 | 5 | 9 | 16 | 32 | 19 | 21 |
| <Virgin Tape> | | | | | | | | |
| Rf output fluctuation (dB) | ±0.3 | ±0.4 | ±0.2 | ±0.2 | ±0.4 | ±0.7 | ±0.6 | ±0.6 |
| Dynamic friction coefficient (μk) | 0.24 | 0.26 | 0.25 | 0.25 | 0.27 | 0.28 | 0.28 | 0.27 |
| Dropout (pce/sec) (15μ/20 dB) | 7 | 5 | 4 | 8 | 12 | 20 | 11 | 9 |

Samples 11 through 16 having used polyurethane resins relating to the invention are superior to the comparative examples (11) and (12) in the electromagnetic conversion characteristics, jitter, and still life. Samples 11 through 16 have not had any tape-damages such as an edge-crease, and an uneven fan-out even after a 100-time running test was tried, and they have also had a small dynamic friction coefficient. In addition, samples 11 through 16 have had an output fluctuation tion within a narrow range and a drop-out in a low-level.

Next, several pieces of video-tapes were prepared by making use of the same construction and formula as in the video-tapes of Example 11, except that the silica content of the magnetic powder was variously changed. The RF outputs of the resulting video-tapes were measured. The results thereof are shown in FIG. 3.

Further, several pieces of video-tapes were prepared by making use of the same construction and formula as in the video-tapes of Example 14, except that the silica content of the magnetic powder was variously changed. The RF outputs of the resulting video-tapes were measured. The results thereof are shown in FIG. 4.

Figure 3:
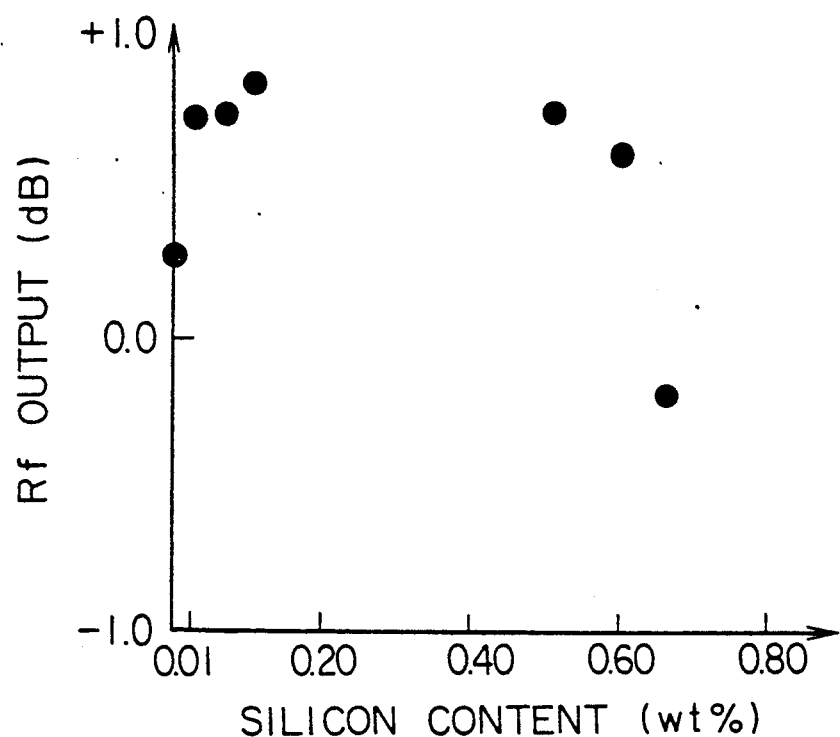
FIGS. 3 and 4 are the graphs each exhibiting the RF output variations to the variations of different metal contents of magnetic powder.
Figure 4:
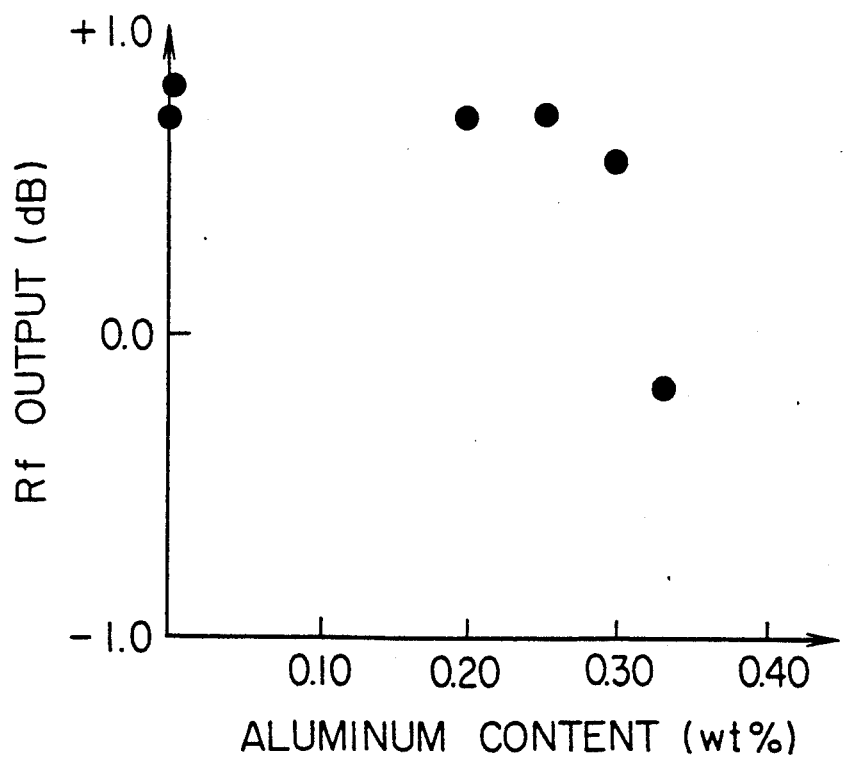

It can be found from the results shown in FIGS. 3 and 4 that the effects of the invention can remarkably be displayed when the above-mentioned silica and aluminium contents are within the specific ranges.

port was subjected to a super-calender treatment, so that each of the magnetic layers having the various composition shown in Table-5 was formed.

Furthermore, the same BC layers as those of Example 1 were coated, respectively.

Each of the wide magnetic films comprising the magnetic layer and BC layer each having a specific thickness was prepared in the above-mentioned manner, and was then rolled round a reel. The resulting films were cut by every ½ inch-wide so as to make the video-tapes shown in Table-5. In Table-5, the numerals indicate each a part by weight.

TABLE-5

|  | Example |  |  | Comparative Example |  |  |  |
|---|---|---|---|---|---|---|---|
|  | 21 | 22 | 23 | (21) | (22) | (23) | (24) |
| $CrO_2$ magnetic powder | | | | | | | |
| A | 100 | — | — | 100 | — | — | — |
| B | — | 100 | — | — | 100 | — | — |
| C | — | — | 100 | — | — | 100 | 100 |
| Vinyl chloride type copolymer | 14 | 10 | 13.5 | 14 | 10 | 13.5 | 15 |
| Polyurethane resin of the invention | | | | | | | |
| (a) | 15 | — | — | — | — | — | — |
| (b) | — | 17 | — | — | — | — | — |
| (c) | — | — | 13.5 | — | — | — | — |
| Sulfonic acid-modified poly- | — | — | — | 15 | — | — | — |

TABLE-5-continued

|  | Example | | | Comparative Example | | | |
|---|---|---|---|---|---|---|---|
|  | 21 | 22 | 23 | (21) | (22) | (23) | (24) |
| urethane resin |  |  |  |  |  |  |  |
| Carboxylic acid-modified polyurethane resin | — | — | — | — | 17 | — | — |
| Hydroxyl group containing popyurethane resin | — | — | — | — | — | 13.5 | — |
| Phosphoric acid-modified polyurethane resin | — | — | — | — | — | — | 12 |
| Dispersant: Lecithin | 2 | 3 | 3 | 2 | 2 | 3 | 3 |
| Carbon black | 8.0 | 1.0 | 0.3 | 8.0 | 1.0 | 0.3 | 0.3 |
| Stearic acid | 1.0 | 1.5 | 1.0 | 1.0 | 1.5 | 1.0 | 1.0 |
| Butyl stearate | 1.0 | 1.0 | 1.0 | 1.0 | 1.0 | 1.0 | 1.0 |
| Cyclohexanone | 40 | 40 | 20 | 40 | 40 | 20 | 20 |
| Methylethyl ketone | 80 | 60 | 90 | 80 | 60 | 90 | 90 |
| Toluene | 80 | 100 | 90 | 80 | 100 | 90 | 90 |

The chromium dioxide $CrO_2$ magnetic powder shown in Table-5 has the following characteristics.

|  | A | B | C |
|---|---|---|---|
| Magnetic coersivity (Oe) | 680 | 730 | 850 |
| Specific surface area (BET, $m^2/g$) | 30.2 | 33.5 | 38.3 |
| Magnetized amount (emu/g) | 63.0 | 64.2 | 64.5 |
| Particle-size on longer axis (μm) | 0.5 | 0.4 | 0.3 |
| Axial ratio | 10:1 | 10:1 | 10:1 |
| Moisture content | 0.4 | 0.4 | 0.4 |

The polyurethane resins (a) through (c) each relating to the invention are the same as those of Example 1.

The resulting samples were evaluated in the same manner as in Example 1 and the results thereof were obtained as shown in Table -6.

lumi-S/N, chroma-S/N, and Rf output, jitter, and still life. Samples 21 through 23 have not had any tape-damages such as an edge-crease, and an uneven fan-out even after a 100-time running test was tried, and they have also had a small dynamic friction coefficient.

In addition, samples 21 through 23 have had an output fluctuation within a narrow range, and a drop-out in a low-level.

EXAMPLE 4

Preparation of Video-Tape

A magnetic layer was first provided in the following manner onto a support comprising a 10 μm-thick polyethyleneterephthalate film.

Each of the magnetic paints was prepared by making use of the specific magnetic metal powder and then by dispersing each of the components shown in Table-6. The resulting magnetic paint was filtrated through a 1 μm-mesh filter and was then added with 5 parts of polyfunctional isocyanate. The resulting coating solution was coated on the support to have a thickness of 2.5 μm and thus coated support was subjected to a supercalender treatment, so that each of the magnetic layers having the various composition shown in Table-6 was formed.

About the magnetic metal powder, the proportion of the iron atom content to the aluminium atom content thereof is shown.

After then, the same BC layers, as those of Example 1 were coated, respectively.

Each of the wide magnetic films comprising the magnetic layer and BC layer each having a specific thickness was prepared in the above-mentioned manner, and was then rolled round a reel. The resulting films were cut by every ½ inch-wide so as to make the video-tapes shown in Table-6. In Table-6, the tape numbers correspond to the numbers of the examples and comparative examples.

TABLE-6

|  | Example | | | Comparative Example | | | |
|---|---|---|---|---|---|---|---|
|  | 21 | 22 | 23 | (21) | (22) | (23) | (24) |
| <Electromagnetic Conversion Characteristics> | | | | | | | |
| Limi-S/N (dB) | +0.5 | +0.3 | +0.7 | 0.0 | −0.2 | +0.1 | −0.4 |
| Chroma-S/N (dB) | +0.9 | +0.7 | +0.5 | +0.5 | +0.3 | +0.1 | −0.1 |
| Rf output (dB) | +0.6 | +0.5 | +0.8 | +0.1 | +0.1 | 0.0 | −0.3 |
| <Runnability and Durability> | | | | | | | |
| Jitter (μsec) | 0.07 | 0.06 | 0.06 | 0.07 | 0.08 | 0.09 | 0.06 |
| Still-life (min) | >60 | >60 | >60 | 50 | 23 | 46 | 38 |
| ≤100-passed Tape> | | | | | | | |
| Rf Output fluctuation (dB) | ±0.6 | ±0.3 | ±0.4 | ±0.8 | ±0.9 | ±0.7 | ±0.7 |
| Tape damage | none | none | none | more or less | more or less | many | none |
| Dynamic friction coefficient (μk) | 0.28 | 0.25 | 0.26 | 0.32 | 0.29 | 0.31 | 0.28 |
| Dropout (pce/sec) (15μ/20 dB) | 8 | 7 | 9 | 11 | 9 | 13 | 18 |
| <Virgin Tape> | | | | | | | |
| Rf output fluctuation (dB) | ±0.3 | ±0.3 | ±0.2 | ±0.4 | ±0.4 | ±0.3 | ±0.5 |
| Dynamic friction coefficient (μk) | 0.23 | 0.24 | 0.23 | 0.26 | 0.27 | 0.28 | 0.25 |
| Dropout (pce/sec) (15μ/20 dB) | 4 | 7 | 8 | 9 | 8 | 10 | 12 |

Samples 21 through 23 each prepared by dispersing the polyurethane resins relating to the invention are superior to the comparative examples (21) and (24) in the electromagnetic conversion characteristics such as The characteristics of theus prepared video-tapes were measured and the results thereof are shown in Table-6.

TABLE 6

| Magnetic paint component | Example 1 100 parts (Fe—Al) | Example 2 100 parts (Fe—Al) | Example 3 100 parts (Fe—Al) | Example 4 100 parts (Fe—Al) | Example 5 100 parts (Fe—Al—Ni) | Example 6 100 parts (Fe—Al—Zn) | Example 7 100 parts (Fe—Al—Mn) | Example 8 100 parts (Fe—Al) |
|---|---|---|---|---|---|---|---|---|
| Magnetic metal powder | | | | | | | | |
| Component content proportion (By numbers of atoms) | | | | | | | | |
| Fe atoms:Al atoms | 100:1 | 100:5 | 100:20 | 100:5 | 100:5:2 | 100:5:2 | 100:5:2 | 100:5 |
| Specific surface area (BET, $m^2/g$) | 50 | 50 | 50 | 45 | 50 | 50 | 50 | 50 |
| Vinyl chloride type copolymer | 13 | 13 | 13 | 13 | 13 | 13 | 13 | 13 |
| Betaine type polyurethane {Synthesis Example (a)} | 10 | 10 | 10 | 10 | 10 | 10 | 10 | 10 {S-e(b)} |
| Alumina | 9 | 9 | 9 | 9 | 9 | 9 | 9 | 9 |
| Methylethyl ketone | 250 | 250 | 250 | 250 | 250 | 250 | 250 | 250 |
| Toluene | 200 | 200 | 200 | 200 | 200 | 200 | 200 | 200 |
| Cyclohexanone | 100 | 100 | 100 | 100 | 100 | 100 | 100 | 100 |
| Stearic acid | 2 | 2 | 2 | 2 | 2 | 2 | 2 | 2 |
| Butyl stearate | 1 | 1 | 1 | 1 | 1 | 1 | 1 | 1 |
| <Electromagnetic conversion characteristics> | | | | | | | | |
| Lumi-S/N (dB) | 2.5 | 3.0 | 2.5 | 2.2 | 2.4 | 2.4 | 2.3 | 2.6 |
| Chroma-S/N (dB) | 1.5 | 1.6 | 1.4 | 1.2 | 1.5 | 1.4 | 1.3 | 1.6 |
| Rf output (dB) | 2.8 | 3.1 | 2.6 | 2.4 | 2.5 | 2.6 | 2.3 | 2.8 |
| <Runnability, Durability> | | | | | | | | |
| Jitter (μsec) Still life (min) | >120 | >120 | >120 | >120 | >120 | >120 | >120 | >120 |
| Saturated magnetization residual ratio (%) | 94 | 93 | 94 | 93 | 94 | 94 | 94 | 93 |
| Shed | E | E | E | E | E | E | E | E |
| Head clopping | G | E | G | E | G | G | G | E |
| <100-time passed tape> | | | | | | | | |
| Rf output fluctuation (dB) | 0.4 | 0.4 | 0.3 | 0.3 | 0.4 | 0.4 | 0.4 | 0.3 |
| Tape damage | None | None | None | None | None | None | More or less damaged | |
| Dynamic friction coefficient (μk) | 0.24 | 0.24 | 0.23 | 0.24 | 0.25 | 0.25 | 0.24 | 0.23 |
| Drop-out (pc/min) 15μ/20 dB | 9 | 10 | 8 | 9 | 8 | 8 | 9 | 10 |
| <Virgin tape> | | | | | | | | |
| Rf output variation (dB) | 0.2 | 0.2 | 0.2 | 0.2 | 0.2 | 0.2 | 0.3 | 0.2 |
| Dynamic friction coefficient (μk) | 0.20 | 0.20 | 0.19 | 0.20 | 0.21 | 0.21 | 0.21 | 0.19 |
| Drop-out (pc/min) (15μ/20 dB) | 3 | 4 | 3 | 5 | 2 | 2 | 3 | 4 |

| Magnetic paint component | Example 9 100 parts (Fe—Al) | Comp. Example 1 100 parts (Fe—Al) | Comp. Example 2 100 parts (Fe—Al) | Comp. Example 3 100 parts (Fe—Al) | Comp. Example 3 100 parts (Fe—Al) | Comp. Example 4 100 parts (Fe—Al) | Comp. Example 5 100 parts (Fe—Ni) |
|---|---|---|---|---|---|---|---|
| Magnetic metal powder | | | | | | | |
| Component content proportion (By numbers of atoms) | | | | | | | |
| Fe atoms:Al atoms | 100:5 | 100:0.5 | 100:22 | 100:5 | 100:5 | 100:5 | 100:5 |
| Specific surface area (BET, $m^2/g$) | 50 | 50 | 50 | 40 | 40 | 50 | 50 |
| Vinyl chloride type copolymer | 13 | 13 | 13 | 13 | 13 | 13 | 13 |
| Betaine type polyurethane {Synthesis Example (a)} | 10 {S-E(c)} | 10 | 10 | 10 {S-e(b)} | 10 {S-E(c)} | 10 * | 10 |
| Alumina | 9 | 9 | 9 | 9 | 9 | 9 | 9 |
| Methylethyl ketone | 250 | 250 | 250 | 250 | 250 | 250 | 250 |
| Toluene | 200 | 200 | 200 | 200 | 200 | 200 | 200 |
| Cyclohexanone | 100 | 100 | 100 | 100 | 100 | 100 | 100 |
| Stearic acid | 2 | 2 | 2 | 2 | 2 | 2 | 2 |
| Butyl stearate | 1 | 1 | 1 | 1 | 1 | 1 | 1 |
| <Electromagnetic conversion characteristics> | | | | | | | |
| Lumi-S/N (dB) | 2.5 | 2.0 | 1.5 | 1.0 | 2.0 | 1.4 | 1.4 |
| Chroma-S/N (dB) | 1.5 | 1.0 | 0.8 | 0.7 | 0.7 | 0.6 | 0.9 |
| Rf output (dB) | 2.5 | 2.2 | 1.6 | 1.3 | 1.3 | 1.4 | 1.5 |
| <Runnability, Durability> | | | | | | | |
| Jitter (μsec) Still life (min) | >120 | >120 | 100 | 110 | 110 | 95 | 110 |
| Saturated magnetization residual ratio (%) | 93 | 85 | 96 | 93 | 93 | 95 | 78 |
| Shed | E | F | P | G | F | F | F |
| Head clopping | E | P | F | F | P | F | F |
| <100-time passed tape> | | | | | | | |
| Rf output fluctuation (dB) | 0.3 | 0.9 | 1.0 | 0.8 | 0.8 | 0.9 | 0.9 |
| Tape damage | | | More or less damaged | | | | |
| Dynamic friction coefficient | 0.24 | 0.27 | 0.28 | 0.28 | 0.28 | 0.28 | 0.29 |

TABLE 6-continued

| | | | | | | | |
|---|---|---|---|---|---|---|---|
| (μk) | | | | | | | |
| Drop-out (pc/min) 15μ/20 dB | 9 | 18 | 15 | 19 | 19 | 21 | 18 |
| <Virgin tape> | | | | | | | |
| Rf output variation (dB) | 0.2 | 0.5 | 0.5 | 0.6 | 0.6 | 0.4 | 0.5 |
| Dynamic friction coefficient (μk) | 0.20 | 0.23 | 0.23 | 0.24 | 0.24 | 0.23 | 0.24 |
| Drop-out (pc/min) (15μ/20 dB) | 3 | 7 | 8 | 7 | 7 | 10 | 8 |

(Note)
*Esthane 5701, mfd. by Goodrich Co.

The items subject to evaluation were measured in accordance with the following standards and the results thereof are thereby indicated.

Lumi-S/N:

The measurement was made by means of a color video noise meter. Shiba-Soku 925D/I and also with a 10 kHz high-pass filter and a 4.2 MHz low-pass filter. For the measurement, a 8-mm video deck was used as a VTR.

Still-flame life:

A period of time required for lowering an still-flame by 2 dB is indicated by a minute unit. The more this value, the higher the durability and abrasion resistance of a magnetic recording medium.

Saturated magnetization residual ratio:

Before and after a sample tape was allowed to stand for one week in an atmosphere of 60° C. and 80% RH, both saturated magnetization of the tape were measured. The saturated magnetization residual ratio of the tape after allowed to stand is indicated by what percentage of the saturated magnetization measured before the tape was allowed to stand corresponds to that measured after it was allowed to stand.

Shed:

After a sample tape was run on a video deck continuously for 200 hours at 40° C. and 80% RH, a shed was measured and the results thereof were graded as follows.

E: Excellent
G: Good
F: Fair, and
P: Poor

Head clogging:

After a sample tape was run on a video deck continuously for 200 hours at 40° C. and 80% RH, a head clogging was measured and the results thereof were graded as follows.

E: Excellent
G: Good
F: Fair, and
P: Poor

It can be found from the results shown in Table-6 that the characteristics of a tape can remarkably be improved by constituting a magnetic tape in accordance with the invention. To be more concrete, it is very advantageous to use magnetic metal powder having a BET value of not less than 45 m$^2$/g, to specify the proportion of the iron atom content to the aluminium atom content each in the magnetic metal powder, and to use a betaine type polyurethane in a binder.

What is claimed is:

1. A magnetic recording medium comprising a magnetic layer containing a magnetic powder and a binder, wherein said binder comprises a polyurethane resin having an average molecular weight of from about 5,000 to 100,000 and having a betaine group in the form of an intramolecular salt;

said magnetic powder is selected from the group consisting of a ferro-magnetic cobalt-containing iron oxide powder, a ferro-magnetic chromium dioxide powder and a magnetic metal powder containing iron atoms and aluminum atoms in a range of from 100:1 to 100:20 in terms of the number of atoms; and sad betaine group is represented by the following Formula (1) or (2) in a ratio of from 0.01 mmol/g to 1.0 mmol/g $$A-N^{\oplus}-(CH_2)_m-X^{\ominus} \quad (1)$$

$$R-B-(CH_2)_n-N^{\oplus}-(CH_2)_m-X^{\ominus} \quad (2)$$

wherein $X^{\ominus}$ is $-SO_3^{\ominus}$, $-O-SO_3^{\ominus}$, $-COO^{\ominus}-$, $-O-PO_3H^{\ominus}$, $-OPO_3^{\ominus}$ or $-OPO_2H_2^{\ominus}$; A is a hydrogen atom or an alkyl group having 1 to 60 carbon atoms; B is $-COO-$ or $-CONH-$; R is an alkyl group, an alkenyl group or aryl group, which have 1 to 12 carbon atoms; n and m are independently an integer of 1 to 10; and $\sim N^{\oplus}\sim$ represents the polyurethane chain of said polyurethane resin.

2. The medium of claim 1, wherein said betaine group is present in an amount within the range of from 0.01 mmol/g to 0.5 mmol/g.

3. The medium of claim 1, wherein said polyurethane resin has an average molecule weight within the range of from 10000 to 40000.

4. The medium of claim 1, wherein said magnetic powder is said ferromagnetic cobalt-containing iron oxide powder.

5. The medium of claim 4, wherein said ferromagnetic cobalt-containing iron oxide powder is a cobalt adsorbed type ferromagnetic iron oxide powder.

6. The medium of claim 4, wherein said ferromagnetic cobalt-containing iron oxide powder contains cobalt in an amount of from 1.0 to 5.0% by weight.

7. The medium of claim 4, wherein said ferromagnetic cobalt-containing iron oxide powder has a BET specific surface area of from 10 to 70 m$^2$/g.

8. The medium of claim 4, wherein said ferromagnetic cobalt-containing iron oxide has an average particle size of from 0.1 μm to 0.8 μm on long axis and 0.01 μm to 0.2 μm on short axis.

9. The medium of claim 4, wherein said ferromagnetic cobalt-containing iron oxide powder has a coersive force of from 600 to 1100 Oe.

10. The medium of claim 4, wherein said ferromagnetic cobalt-containing iron oxide powder contains silicon in an amount of from 0.01% to 0.60 % by weight.

11. The medium of claim 4, wherein said ferromagnetic cobalt-containing iron oxide powder contains aluminum in an amount of from 0.001% to 0.30% by weight.

12. The medium of claim 1, wherein said magnetic powder is said ferromagnetic chromium dioxide powder.

13. The medium of claim 12, wherein said magnetic powder is said ferromagnetic chromium dioxide powder has a BET specific furface area of from 15 $m^2/g$ to 60 $m^2/g$.

14. The medium of claim 12, wherein said ferromagnetic chromium dioxide powder has an average particle size of from 0.1 μm to 0.8 μm on long axis and 0.01 μm to 0.2 μm on short axis.

15. The medium of claim 12, wherein said ferromagnetic chromium dioxide powder has a coersive force of from 600 Oe to 1200 Oe.

16. The medium of claim 1, wherein said magnetic powder is a magnetic metal powder.

17. The medium of claim 16, said magnetic metal powder contains iron atoms and aluminum atoms in a ratio of from 100:1 to 100:8 in atomic numbers.

18. The medium of claim 16, wherein said magnetic metal powder has a BET specific surface area of not less than 45 $m^2/g$.

19. The medium of claim 1, wherein said magnetic layer further contains a vinyl chloride copolymer comprised of a vinyl chloride monomer and a monomer having a group of —COOM, —SO$_3$M, —SO$_4$M, —PO$_3$M$_2$ or —PO$_4$M$_2$, wherein M is a hydrogen atom, a lithium atom, a sodium atom or a potassium atom.

20. The medium of claim 19, wherein said vinyl chloride copolymer comprised of a vinyl chloride monomer; a monomer having a group of —COOM, —SO$_3$M, —SO$_4$M, —PO$_3$M$_2$, or —PO$_4$M$_2$, wherein M is a hydrogen atom, a lithium atom, a sodium atom or a potassium atom; and a monomer having an epoxy group.

21. The medium of claim 19, wherein said magnetic layer contains polyurethane resin and vinyl chloride copolymer in a ratio of from 8:2 to 2:8 by weight.

22. The medium of claim 21, wherein said magnetic layer contains polyurethane resin and vinyl chloride copolymer in a ratio of from 7:3 to 6:4 by weight.

* * * * *

UNITED STATES PATENT AND TRADEMARK OFFICE
CERTIFICATE OF CORRECTION

PATENT NO. : 5,064,720
DATED : November 12, 1991
INVENTOR(S) : Tsutomu Kempo, et. al.

It is certified that error appears in the above-indentified patent and that said Letters Patent is hereby corrected as shown below:

On the Title page, item [54] and col. 1, line 4, change "INTERMOLECULAR" to -- INTRAMOLECULAR--.

Title page, item [57]

Abstract, line 10, change "anad" to --and--.

Claim 1, column 34, line 22, change "sad" to --said--.

Signed and Sealed this

First Day of February, 1994

Attest:

BRUCE LEHMAN

Attesting Officer     Commissioner of Patents and Trademarks